United States Patent

[11] 3,622,692

[72] Inventor Kenneth D. Stephens, Jr.
Salt Lake City, Utah
[21] Appl. No. 804,733
[22] Filed Feb. 10, 1969
[45] Patented Nov. 23, 1971
[73] Assignee Alberto R. Esteves
Hato Rey, San Juan, P.R.
Continuation-in-part of application Ser. No. 593,756, Nov. 14, 1966, now abandoned. This application Feb. 10, 1969, Ser. No. 804,733

[54] SEQUENTIAL COLOR TELEVISION SYSTEM
47 Claims, 38 Drawing Figs.

[52] U.S. Cl. .......... 178/5.2 R, 178/5.4 ST
[51] Int. Cl. .......... H04n 9/06
[50] Field of Search .......... 178/5.2, 5.4, 5.4 ST; 350/169

[56] References Cited

UNITED STATES PATENTS

| | | | |
|---|---|---|---|
| 2,566,713 | 9/1951 | Zworykin | 178/5.4 |
| 2,603,706 | 7/1952 | Sleeper | 178/5.2 |
| 2,710,890 | 6/1955 | Skellett | 178/5.4 |
| 2,971,051 | 2/1961 | Back | 178/5.4 |
| 3,006,989 | 10/1961 | Schroter | 178/5.4 |
| 3,293,357 | 12/1966 | Doi et al. | 178/5.4 |
| 2,319,789 | 5/1943 | Chambers | 178/5.2 |
| 2,580,073 | 12/1951 | Burton | 178/54 PE |
| 2,618,701 | 11/1952 | Christensen | 178/5.4 ST |
| 2,757,228 | 7/1956 | Tomer | 178/5.4 |

OTHER REFERENCES

Southall, Mirrors, Prisms and Lenses, Macmillan Co., 1923, pp. 105–107.

*Primary Examiner*—Robert L. Griffin
*Assistant Examiner*—John C. Martin
*Attorney*—Lyon & Lyon

ABSTRACT: There is disclosed herein a color television system, including method and apparatus, wherein a polychromatic image is separated into color components and applied to a conventional camera black and white pickup tube. The information from the camera is transmitted in any conventional way, by cable or antenna, to one or more television display devices (receivers or monitors) employing a conventional color cathode-ray tube therein. In order to properly synchronize the operation of the camera and the display devices, a particular vertical scan rate frequency ratio, such as one to three, between the camera and display device is used. In one embodiment, the camera may be modified to have a 20 hertz vertical scan, and operate in conjunction with a conventional color television receiver or monitor. In another embodiment, the camera operates at its usual vertical scan rate of 60 hertz, or a lower scan rate, and is used with a receiver or monitor which has been modified to have a vertical scan rate three times that of the camera. Various embodiments are disclosed for cameras and display devices, as well as gating, encoding and decoding systems, and systems for duty cycle extension, and arrangements for color enhancement.

INVENTOR
KENNETH D. STEPHENS, JR.
BY
Lyon & Lyon
ATTORNEYS

INVENTOR
KENNETH D. STEPHENS, JR.

BY Lyon & Lyon

ATTORNEYS

INVENTOR
KENNETH D. STEPHENS, JR.
BY Lyon & Lyon
ATTORNEYS

INVENTOR
KENNETH D. STEPHENS, JR.
BY
Lyon & Lyon
ATTORNEYS

INVENTOR
KENNETH D. STEPHENS, JR.
BY Lyon & Lyon
ATTORNEYS

INVENTOR
KENNETH D. STEPHENS, JR.
BY Lyon & Lyon
ATTORNEYS

INVENTOR
KENNETH D. STEPHENS, JR.
BY Lyon & Lyon
ATTORNEYS

PATENTED NOV 23 1971

3,622,692

INVENTOR
KENNETH D. STEPHENS, JR.
BY Lyon & Lyon
ATTORNEYS

INVENTOR
KENNETH D. STEPHENS, JR.

BY Lyon & Lyon

ATTORNEYS

INVENTOR
KENNETH D. STEPHENS, JR.
BY Lyon & Lyon
ATTORNEYS

INVENTOR
KENNETH D. STEPHENS, JR.
BY
Lyon & Lyon
ATTORNEYS

INVENTOR
KENNETH D. STEPHENS, JR.
BY Lyon & Lyon
ATTORNEYS

INVENTOR.
KENNETH D. STEPHENS, JR.
BY Lyon & Lyon
ATTORNEYS

SEQUENTIAL COLOR TELEVISION SYSTEM

CROSS REFERENCE TO RELATED APPLICATIONS

This application is a continuation-in-part of applicant's copending application Ser. No. 593,756, filed Nov. 14, 1966, for "Sequential Color Television System" now abandoned. Reference is also made to copending application Ser. No. 532,267, filed Mar. 7, 1966, for "System for Television Reproduction" now U.S. Pat. No. 3,485,944 and copending application Ser. No. 522,623, filed Jan. 24, 1966, for "Recording and/or Reproducing High Frequency Signals" now U.S. Pat. No. 3,539,712.

BACKGROUND OF THE INVENTION

The present invention relates to methods and apparatus for color television systems, and components thereof, and more particularly to sequential color television pickup, transmission and reception.

Briefly, the present invention falls within the art of field sequential color television systems.

Presently, the broadcast standards in the United States require a synchronizing frequency and bandwidth standard that corresponds to a sequence standard of 60 hertz. This means that the detecting face of a television pickup tube is electronically scanned 60 times every second. The area covered by a complete scan is referred to as a raster. Normally, each raster consists of 262½ lines covered in a one field scan, and a second 262½ line field comprising a video frame of 525 horizontal lines. Therefore, in a 1/30th second period of time a raster consists of 525 scanned lines which produces an image having acceptable intensity and definition.

The designation "sequential color" describes a manner in which images are electronically scanned and transmitted for subsequent display. More specifically, a polychromatic image is separated into primary colors and the resulting images are successively picked up and transmitted in a sequential signal train. The described sequential method, therefore, differs from simultaneous television pickup techniques because, in the simultaneous color method, a plurality of images are simultaneously picked up and thereafter simultaneously transmitted. The precise synchronizing requirements of such a simultaneous system demand large expenditures of time for adjustment and repair. Moreover, bulky packaging is required to house the extensive circuitry, etc., and thus limits mobility. The financial outlay for initial simultaneous equipment and subsequent repair and maintenance is enormous.

In an attempt to overcome these significant disadvantages of simultaneous color television, research in the area of sequential color television was stimulated.

Systems of sequential color television, as taught by the prior art, have generally proved to be commercially unacceptable. The resulting displayed images have been of low color saturation and intensity. Specifically, with regard to field sequential color television (wherein primary color images are scanned alternately by field raster), problems of edge breakup, color contamination and flicker have hindered, if not prevented, commercial acceptance of prior field sequential proposals.

The commonly known method of field sequential color utilizes a color wheel whereby alternate segments of a television signal, usually one field in size, are exposed sequentially to each of a predetermined number of color primaries (usually three, i.e., red, blue, and green). The color wheel is rotated at a predetermined speed, and placed generally between the primary focusing lens and the pickup tube in the camera. Associated with the color wheel are various synchronizing circuits, pulse codification means, and driving means for the color wheel. The corresponding display device must further have a decoder or synchronized color wheel to reproduce the color image. The difficulties encountered in driving and synchronizing the rotating color wheel, inter alia, have made this method of field sequential color generally commercially unacceptable. Furthermore, the noise created by the driving means, resulting in an annoying background, and the large amount of space occupied by the driving and synchronizing means, resulting in poor mobility or immobility, contribute to generally unsatisfactory color display.

Attempts have been made in prior art sequential television systems to separate a polychromatic image by filters into a plurality of primary color images. Significantly, the resultant displayed images were disadvantageously poor in color intensity and definition. For example, if the polychromatic image were separated into a three-color array with the raster filtered into three primary color images of equal area, which are successively scanned by ⅓ of 525 lines each, the resulting displayed image would be characterized by one-third to one-ninth the original color intensity and definition. The reasons for the mentioned unacceptable reproduction are as follows: (a) each primary color image in the raster is scanned only one-third the total time scanned in the complete raster, resulting in one-third reproduced intensity; (b) each primary color image is vertically scanned only one-third the total raster time resulting in only approximately 175 lines for each primary color image, thereby permitting a reproduction with only one-third the image resolution, having a coarse grain pattern and further causing display image discontinuities; (c) the primary color images are created by filtering out undesired colors from split polychromatic images and the color images are separately transmitted and thereafter superimposed upon one another at the display in an attempt to recover the original colorings, which inherently are, from the beginning, of significantly reduced brilliance. Extensive focusing and many adjustments at the display device are normally necessary to optically align each color for complete resolution. Moreover, no known prior field sequential color television pickup system has been satisfactorily operable using a relatively high-lag pickup device, such as vidicon tube. This incompatibility of prior field sequential methods and relatively high-lag pickup tubes is due to the retention characteristics of the photosurface of the tube resulting in undesired carryover contamination from one color exposure to the next.

It would, therefore, be a significant and worthwhile contribution to the field sequential color television art to provide a sequential color system having the following features; (a) a pickup system capable of dichroically separating a polychromatic image into primary color images with immaterial loss of brightness at the selected frequency band and, thereafter, transmitting resulting signals in a sequential train to a display device; (b) a pickup system that facilitates full-intensity color reproduction; (c) a system accommodating reproduction of an image having distinct resolution; (d) a relatively low-cost, high-lag pickup tube, such as a vidicon, as part of a compact television single-camera system, which may be a modified black and white camera system; (e) a system which does not exhibit display image discontinuities of the type previously mentioned; (f) a system which is easily adjustable to present practices; and (g) a system wherein present receivers is designated for reception of NTSC color transmission can be adapted in an easy manner to receptors of field sequential color transmission. These and other advantages accrue from the present invention.

SUMMARY OF THE INVENTION

In one presently preferred embodiment of a camera according to the present invention, a series of dichroic prisms separate a polychromatic image into three primary color images, e.g., red, blue, and green. Each of these color images is impressed on a specific area of a vidicon or like pickup tube, preferably to comprise a vertically stacked array.

The scanning of the vertical array may be accomplished by any one of at least two presently preferred methods which give high color intensity and good image resolution without image breakup.

One of these preferred methods is especially applicable to cable, microwave, videotape, or any closed-circuit broadcast and is accomplished by scanning all primary color image components as a complete raster containing 525, or preferably more, lines in order to produce a high-quality display picture. If it is desired to permit a camera vertical scan frequency of one-sixtieth of a second, each color image of the array, containing the three vertically stacked color images, is scanned in one one hundred-eightieth of a second so that the three images are successively scanned cumulatively in one-sixtieth of a second.

The second presently preferred method is applicable under circumstances where the display device must also be used for the present standard one-sixtieth of a second scan. In this case, each color image is scanned as a complete raster by inhibiting or suppressing all except every third vertical drive pulse. Therefore, one-sixtieth of a second is required to scan each primary color image with the result that one-twentieth of a second is required for scanning the entire face of the pickup tube, during which time two vertical drive pulses will be inhibited.

In order to prevent flicker that normally arises at this reduced vertical scan speed, duty cycle extension may be implemented at the display. One type of display duty cycle extension, fully disclosed in applicant's copending patent application Ser. No. 532,267, now U.S. Pat. No. 3,485,944, filed Mar. 7, 1966, the disclosure of which is incorporated herein by reference, increases the length of time interval during which a display image emanating from sequential input signals is clearly retained and projected by the control medium of the display device. Other methods, such as a slowly decaying phosphor at the display cathode-ray tube face which increases the time interval during which an image is clearly retained, can be used in conjunction with the present invention to extend the display duty cycle.

Significantly, since each color image at the pickup is scanned as a complete raster, a low cost pickup tube, such as vidicon, may be used in the present camera system in spite of comparatively high lag characteristics. The use of a comparatively high lag vidicon or like pickup tube for high-quality color television pickup is novel in the art, not being acceptable with prior art sequential color systems. According to the invention, the images scanned in either way as described are codified and the sequential electronic signals are transmitted for display on a conventional three-gun color cathode-ray tube, for storage on video tape, etc.

In one embodiment of the system according to the present invention, a modified black and white video camera having color splitting optics is used in conjunction with a color monitor, the scan rate between the camera and monitor having a predetermined ratio. In another embodiment of the present invention, a conventional television receiver designed for reception of NTSC color transmission is modified in a simple manner so as to selectively receive field sequential color transmission on blank channels thereof. Principally, selectable operable switching means is provided for affecting the vertical sweep rate (vertical hold) and vertical size, and gating logic is provided to selectively block out two of the color channels of the color cathode ray tube while not affecting the third channel to allow passage of each of the three primary colors in serial fashion directly corresponding to the rate and color phase of the incoming field sequential color video train. Other camera, display device and system embodiments will be given.

Additionally, the present invention contemplates a complete color television system, and its components, including both method and apparatus, wherein pickup codification, decodification and display is provided which is suitable for either cable or antenna transmission, or storage and delayed retrieval, over virtually any systems and devices capable of handling black-and-white video information presently found in the art. That is, any currently available equipment which can handle black-and-white video information (e.g., cable, transmitting apparatus, recorders, and so forth) can likewise handle the video information between a camera and receiver of the present invention.

Accordingly, it is a primary object of this invention to provide a novel, comparatively low-cost, high-quality sequential color television system, including method and apparatus.

It is another primary object of the present invention to provide a method of and an apparatus for sequential color television transmission which uniquely accommodate sequential raster scanning of each of three input color component images.

It is another object of the present invention to provide sequential color television equipment comprising serial dichroic separation of a polychromatic input into primary color images that are impressed upon the face of a pickup tube preparatory to sequential transmission.

A further object of this invention is the provision of a novel method of and apparatus for high-quality sequential color television pickup and transmission using a single, compact camera system comprising a low-cost, comparatively high lag pickup tube.

Another object of the present invention is to provide a color television system wherein video information between pickup and reproduction can readily be handled by conventional black-and-white television apparatus and transmission equipment.

Another object of the present invention is to provide a field sequential color television codification and decodification which is easily adaptable to standards and practices employed in the present color television art.

A further object of this invention is to enable field sequential color television to be readily adapted to present color television receivers and monitors.

A still further object of the invention is to utilize the sequentially codified nature of color television signals in enabling color receiver reproduction while maintaining a high degree of color channel purity and stability.

An additional object of this invention is to enable relatively easy achievement of high-quality field sequential color television reception from present color receivers.

Another object of this invention is to provide a field sequential video camera output having color identification and which is suitable for recording on virtually all video recording systems.

An additional object of this invention is to provide a field sequential color system having remote optics.

BRIEF DESCRIPTION OF THE DRAWINGS

These and other objects and features of the present invention will become more fully apparent from the following description and appended claims taken in conjunction with the accompanying drawings wherein:

PRIOR ART SYSTEMS

Figure 1:
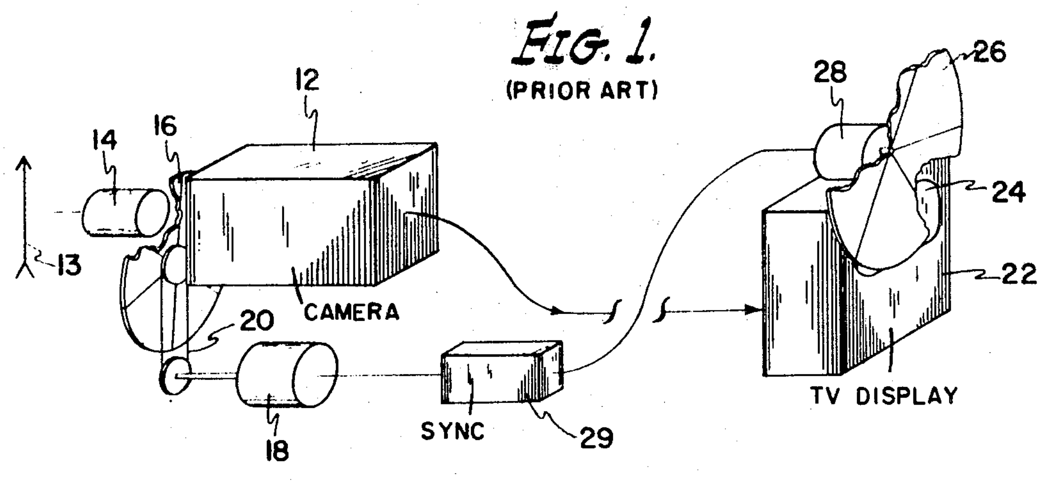
FIG. 1 is a schematic representation of a well-known prior art field sequential color television system.

Reference is now made to FIG. 1 which schematically depicts a television camera 12, as used in the pickup of conventional black and white images. A driven multisection color filter wheel 16 is interposed between the camera 12 and a conventional optics system 14, through which the object 13 is viewed. The wheel 16 is driven by motor 18 through a belt 20 or the like, the motor being controlled to keep the individually colored filter segments of wheel 14 synchronized with the camera vertical scan. This results in successive interpositions of the filter color segments between the optics system and the camera 12, each for a given time interval.

It can thus be seen that the output video from camera 12 will be sequentially color codified with separate fields containing, for example, alternately red, blue and green information. This information is relayed by appropriate means, to a conventional television display device 22, normally used in black-and-white reproduction. A second color wheel 26, driven by motor 28, is interposed between screen 24 of the display device 22 and the viewer. The rotation of the wheel 26 is synchronized and in phase with camera drive motor 18 by suitable means 29 so as to interpose over the display of a display device 22 a filter of a color corresponding to that color instantaneously in series with the pickup camera 12. In this manner, the rotating color wheel 26 averages the colors picked up in the camera and the viewer interprets the image in full color.

Figure 2:
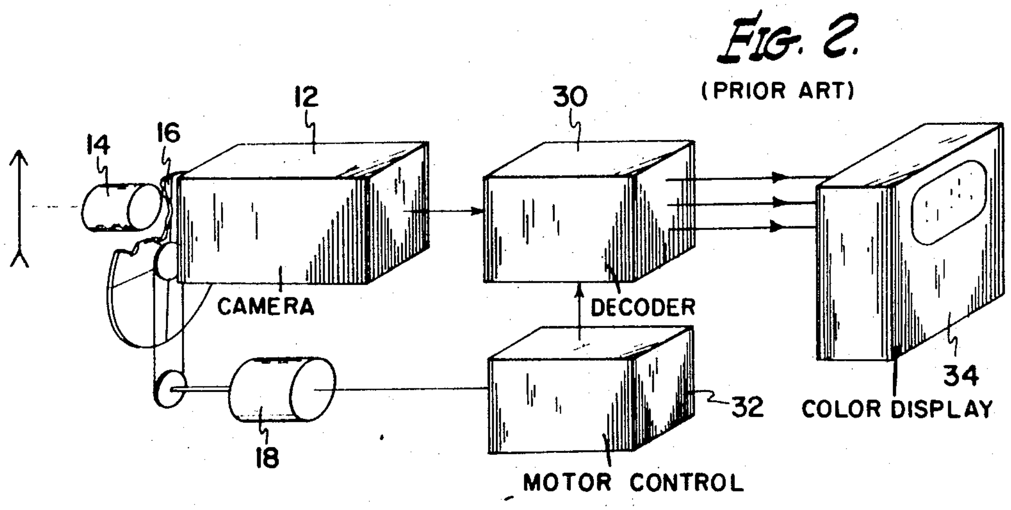
FIG. 2 schematically illustrates a second prior art field sequential color television system.

FIG. 2 depicts a second field sequential system known in the prior art, differing from that represented in FIG. 1 in that a decoder 30 receives a trigger pulses codified in the camera 12 and separates the trigger pulses into primary color video segments which are guided into appropriate output channels. A motor control device 32 keeps the drive motor 18 synchronized with the camera vertical sweep and with decoder 30. The separate primary outputs, e.g., red, blue and green, are then fed to a suitable color display device 34, such as a three-gun color monitor.

DESCRIPTION OF THE PREFERRED EMBODIMENTS

General Description of System

The present invention is directed to a novel color television system, including method and apparatus, as well as cameras and display devices for use therein. Several embodiments of cameras, receivers and monitors, and combinations thereof, are described herein. In each instance the camera and display device vertical scan frequencies preferably have a ratio of one to three. A first example describes a modified camera for use with a conventional color television receiver or monitor wherein the camera vertical scan rate is 20 hertz and the receiver scan rate is the conventional 60 hertz. Although useful, this particular scan rate for the camera results in a noticeable flicker on the receiver. Another example is given wherein a camera operates at a normal 60 hertz vertical scan frequency and a monitor operates at 180 hertz. This has the advantage that the flicker is essentially imperceptible. However, if used with a conventional color receiver, more modifications are required. A compromise between these two also is described herein wherein a camera is modified to operate at 40 hertz and a receiver is modified to operate at 120 hertz.

Figure 3:
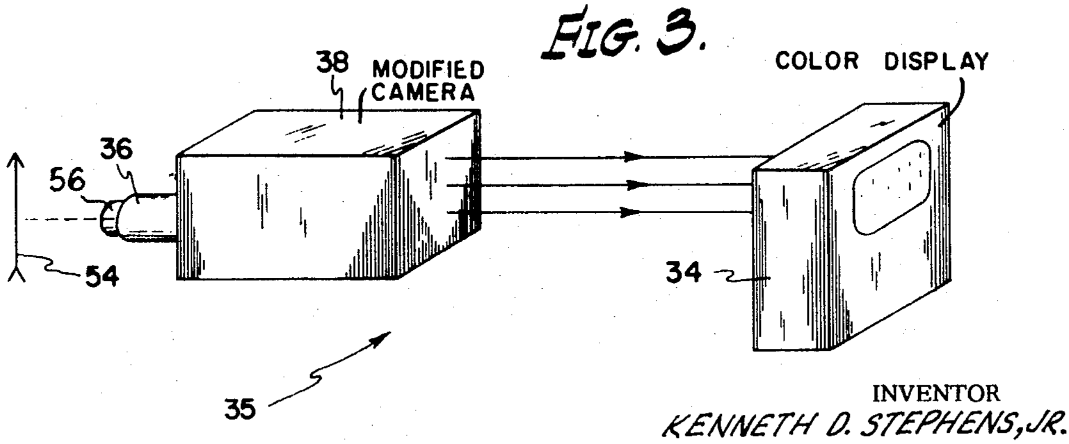
FIG. 3 represents a block diagram of one presently preferred embodiment of the present invention.

Turning now to the drawings, FIG. 3 depicts a sequential color television apparatus 35 comprising a passive dichroic optical system 36. The dichroic optical system 36 serially separates a polychromatic image into three primary colors that are simultaneously projected on the face of a vidicon or like pickup tube 46, such as shown at 48, 50 and 52 in FIG. 4*a*. The pickup tube 46 comprises part of a modified camera 38 (FIG. 3) used in sequentially scanning the color images appearing on the pickup tube.

Optical Systems

Figure 4A:
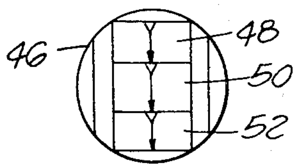
FIG. 4*a* is a schematic representation depicting one ordered array of color images as impressed upon the face of a pickup tube.
Figure 5:
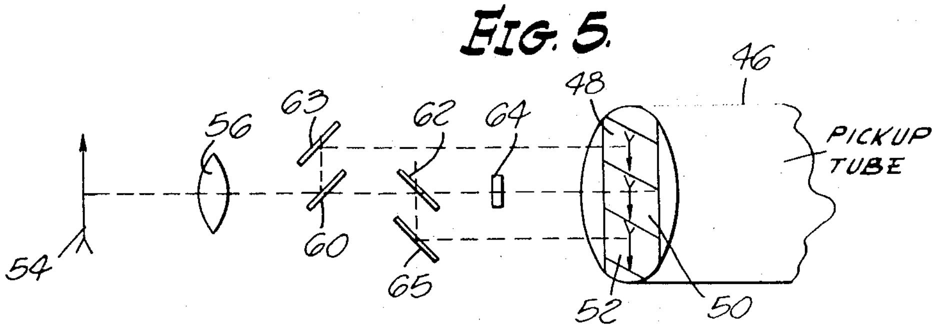
FIG. 5 is a schematic representation of one suitable optics embodiment for achieving the image pattern represented in FIG. 4*a*.

FIG. 5 depicts one apparatus for achieving the preferred pattern of FIG. 4*a* on the face plate of the pickup tube 46. Reflected polychromatic light from an object 54 is relayed by an objective lens system 56 to a complex of first surface, dichroic mirrors 58. Thus, for example, one surface 60 will reflect red light and a second surface 62 will reflect green light and will pass blue light. Therefore, using reflectors 63 and 65, the represented top image 48 of FIG. 4*a* will comprise red light, the bottom image 52 will comprise green light and the center image 50 will comprise blue light. It is preferred that the center image pass through a distance compensating lens 64 (FIG. 5) to compensate for the greater path length traversed by images 48 and 52 so as to present an in focus array of the three images 48, 50 and 52. As is known to those skilled in the art, the element 64 changes the angle of convergence of the light rays as the light enters the element, and restores the original convergence angle as the light leaves the element 64, thereby producing a shift in the focal plane of the image proportional to the thickness of the element 64. In this manner, the optical arrangement focuses the three images in a single plane. In this regard, reference may be made to Southall, Mirrors, Prisms, and Lenses, published by MacMillan Co., 1923, pages 105–107.

Figure 6:
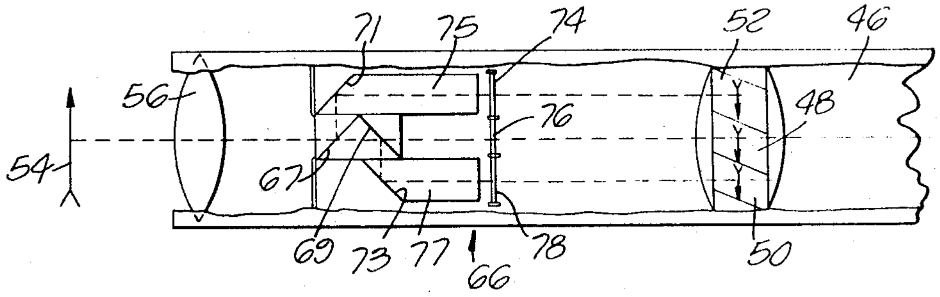
FIG. 6 is a second and presently preferred optics embodiment for creating an image pattern similar to that of FIG. 4*a*.

FIG. 6 illustrates a second and presently preferred optical apparatus for obtaining the image pickup configuration shown in FIG. 4*a*. Here, reflected polychromatic light from a color image 54 is passed through objective lens system 56 into a beam splitting, dichroic prism assembly 66, which, for example, comprises a green reflecting surface 67 and a blue reflecting surface 69. The prism system 66, in conjunction with mirror surfaces 71 and 73, relays the three segregated color images, green 52, red 48 and blue 50, of the original polychromatic image to the face of television pickup tube 46 (FIG. 6). The length and material of the prism members 75 and 77 is chosen to ensure that the blue, red and green images from a given polychromatic image upon the face of the pickup tube 46 in focus. The length and material of the prism members 75 and 77 serves the same function as the compensating element 64 in FIG. 5; that is, when the light rays enter a prism, a shift in the focal point occurs and the rays converge less while travelling through the prism, but shift again upon leaving the prism. In this manner, an in focus array of the three images in a single plane is provided, as with the arrangement of FIG. 5. If prisms inadequate to fully segregate the light into primary color images are used, the color segregated images may be relayed through three separate trimming filters, shown schematically at 74, 76 and 78, passing green, red and blue light, respectively.

The modified camera 39 (FIG. 3) contains a signal decoder (not shown) facilitating separate video outputs of red, blue and green or the like. The signals thus decodified are made suitable to be fed into a conventional color display device 34, which for example, may be a standard residential three-gun color receiver, a color television projector, an NTSC encoder and receiver system, or a modified color receiver or monitor as described subsequently.

Figure 4C:
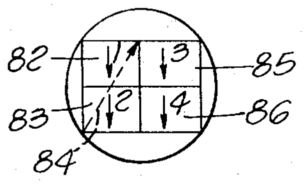
FIGS. 4*b* and 4*c* are similar representations depicting alternative ordered arrays.

For convenience of discussion and definition the camera and receiver each may be considered to have a "scanned raster," as is well known in the art. In FIG. 4*a*, it will be seen that there are three images 48, 50 and 52 for a single scanned raster of the camera. Similarly, if it is desired to use two colors in practicing the present concepts, two images 80 and 81 comprise a single camera raster. In the case of four color system (for example, red, blue, green and yellow) two images 82 and 83 may be scanned in a first camera raster followed by retrace 84 and then a scan of images 85 and 86 in a second camera raster as depicted in FIG. 4*c*.

Figure 4B:
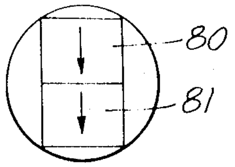

Thus, the concepts of the present invention are not limited to three images in a single raster as depicted in FIG. 4*a* wherein the receiver has a vertical scan rate three times that of the camera (ratio of three to one), but other scan ratios can be used which are a function of the number of images per camera raster. Accordingly, the ratio is three to one for the arrangement in FIG. 4*a* inasmuch as three images are scanned for a single raster; the ratio is two to one for the arrangement depicted in FIG. 4*b* since two images are scanned in a single camera raster; and the ratio likewise is two to one for the arrangement depicted in FIG. 4*c* since two images are scanned for each camera raster. Similarly, the same principles apply to line sequential scanning in which case three horizontally disposed adjacent images usually will be desired, but the scan ratio of interest between camera and receiver is a similar multiple of the horizontal scan rate of the camera rather than the vertical scan rate thereof.

Therefore, in its simplest form the present concepts may be referred to as a system of sequential color pickup and reproduction wherein optical means split a polychromatic image into several color images and wherein the number of images per camera raster times the camera scan rate (horizontal or vertical) is the receiver scan rate (horizontal or vertical, respectively). Accordingly, even though the particular scan ratio of three to one between camera and receiver vertical scan rates is generally described herein as typical, other ratios as noted above between either the vertical or the horizontal scan rates may be employed. Additionally, as will become apparent subsequently various gating, encoding and decoding systems are used. Gating is used at the camera end of the system to send color channels separately to the color inputs of a display device. If gating is not used, then color signals are encoded and, thus, subsequently are decoded at the other end of the system, i.e., at a monitor, receiver, or output of a video tape recorder.

Camera Color Logic (scan and color gating)

Figure 7:
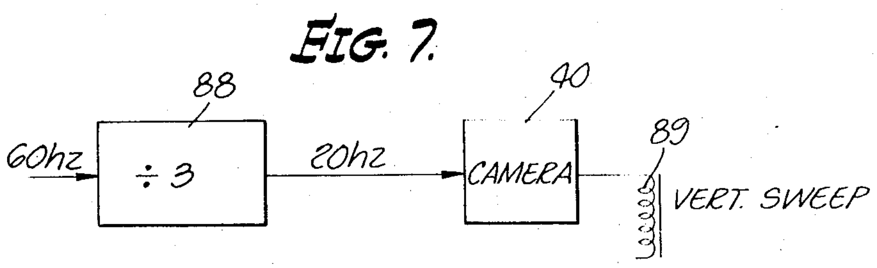
FIG. 7 is a block diagram representing modified vertical scan circuitry of a television camera to achieve high-quality field sequential color pickup.

The camera of this invention may be modified, in a manner hereinafter described, to scan each of the three primary images 48, 50 and 52 (or other images in FIGS. 4*b*, 4*c* or the like), appearing on the vidicon or like pickup tube 46, as a complete raster. The use of a comparatively high-lag pickup tube for high-quality color television pickup has not been achieved before this invention. Experimentation to date has clearly demonstrated that, using the present invention, high-quality television pickup and transmission is accomplished with a vidicon or like pickup tube. More specifically, FIG. 7 generally depicts a block diagram schematically representing modifications to the vertical scan electronics of a conventional black and white television camera for the attainment of sequential color pickup as previously described. A 60 hertz, vertical drive trigger pulse (either self-contained or external) is directed into a divide-by-three counter circuit 88, which forms a train of 20 hertz drive pulses to be fed to the vertical sweep 89 of a black-and-white camera 40. Such modification, in the general case, consists chiefly of changing RC time constants, coupling capacitors, and sweep failure protection circuits, for stable and linear functioning at one-third former rate, i.e., 60 hertz reduced to 20 hertz. It will be apparent that although there is a division of the vertical scan rate by three, the resulting pictures will be displayed at the original repetition rate.

Figure 8:
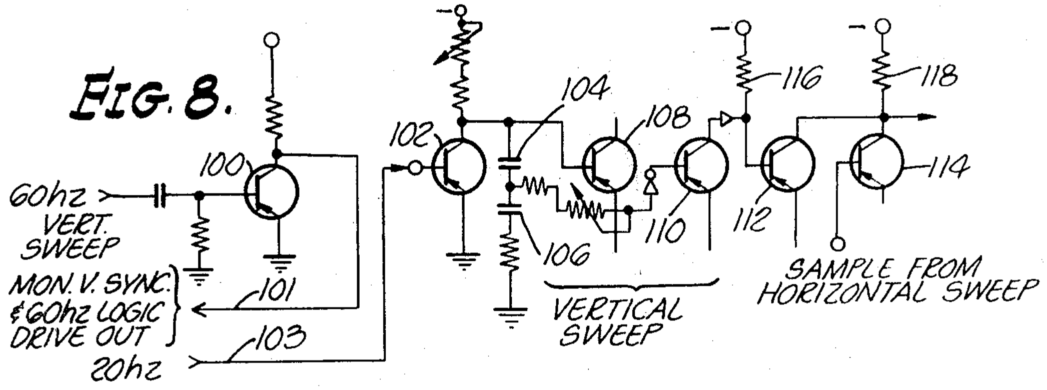
FIG. 8 schematically represents modified vertical sweep circuitry of a television camera to achieve high-quality field sequential color pickup.

FIG. 8 is a partial schematic depicting changes within the vertical sweep circuitry of a conventional solid-state camera of the black-and-white, vidicon utilizing variety. A conventional 60 hertz vertical drive trigger is fed to an adder amplifier stage 100, the output of which is channelled to 60 hertz, vertical synchronizing circuitry and to the "shift" input of a color logic system, such as depicted schematically in FIG. 9. Contained within the logic circuitry shown in FIG. 9 are divide-by-three counter means which form a 20 hertz output trigger to be channelled to the base of vertical sawtooth stage 102 (FIG. 8) by a line 103.

Figure 9:
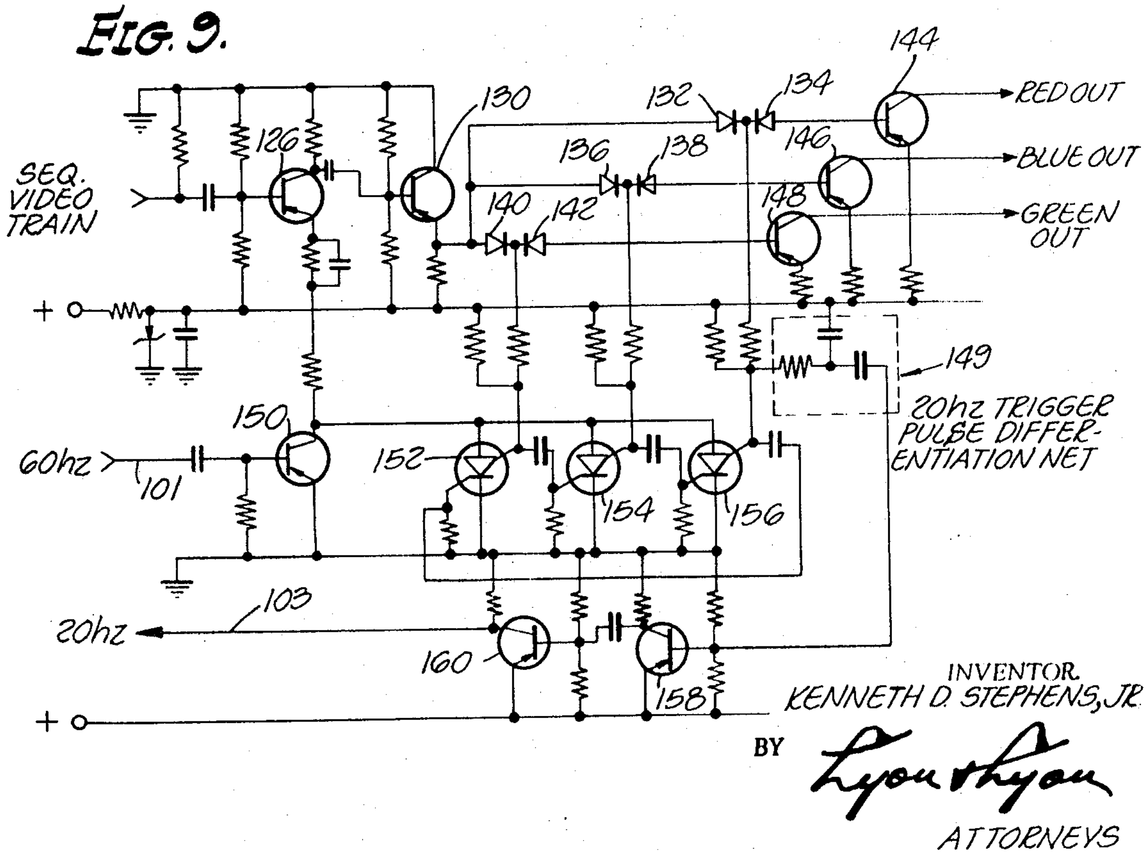
FIG. 9 schematically represents one camera color video gating system incorporating video amplification, color channel gating and processing, pulse-counting and trigger-forming functions.

More specifically, referring to FIG. 9, which schematically depicts circuitry designed to perform basic field sequential color logic functions, transistor 128 accepts the sequential color video train emanating from the camera output, and acts as an inverting and equalizing amplifier, feeding impedance matching emitter follower stage 130. Video from this transistor appears at gates 132, 134, 136, 138, 140 and 142 passing red, blue and green video segments into output amplifier stages 144, 146 and 148, respectively. A 60 hertz "shift" pulse as a sample of camera sync generator vertical drive is directed by a line 101 into current amplifier stage 150, which couples "shift" information into three bistable semiconductors 152, 154 and 156 connected in a ring counter configuration. These are triggered sequentially and each in turn couples an output switch pulse into its associated red, blue or green gate. At semiconductor 156 there is provided a high impedance, 20 hertz trigger pulse differentiation network 149 which drives amplifier stages 158 and 160 to form a 20 hertz, vertical sweep trigger pulse of proper impedance, duration, and amplitude for application by the line 103 to stage 102 of FIG. 8.

Capacitors 104 and 106 in FIG. 8 are made three times the normal black-and-white camera value to facilitate the formation of a 20 hertz sweep waveform. Amplifiers 108 and 110 constitute the vertical sweep output stage and an isolation amplifier, respectively, the signal from the latter being coupled to the base of transistor 112. In like manner, a horizontal sweep sample is fed to the base of transistor 114 and the pair of transistors 112 and 114 form a vidicon blanking circuit exhibiting built-in sweep failure protection. Because of the lower frequency involved, the value of resistor 116 in the base of amplifier 112 is increased to approximately four times its original black-and-white value to maintain proper bias for vidicon unblanking.

Figure 10:
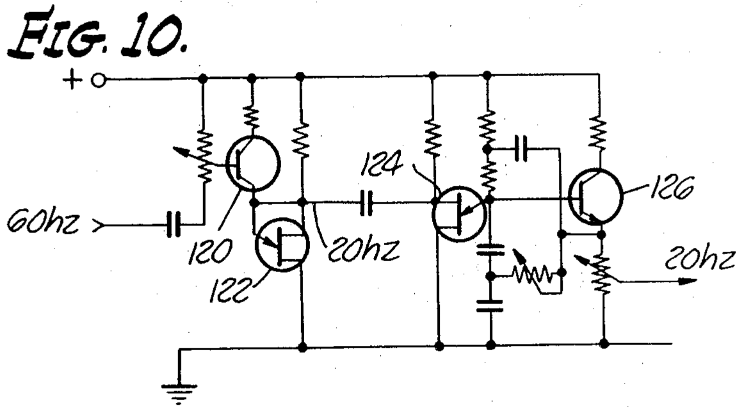
FIG. 10 schematically depicts a camera vertical sweep circuit to achieve high-quality field sequential color pickup.

Reference is now made to FIG. 10 which depicts a schematic of an original black-and-white camera vertical sweep circuit which may be used in place of the vertical sweep circuit of FIG. 8, and which includes amplifiers 120 and 122 connected in a divide-by-three counter configuration putting out a 20 hertz drive pulse derived from the input 60 hertz trigger pulse. Amplifiers 124 and 126 function as sawtooth generator and feedback linearizing/vertical output stages, respectively. This circuit displays the unique advantages of extreme simplicity with a high degree of linearity and overall stability desirable for use in passive field sequential color pickup devices.

Figure 11A:
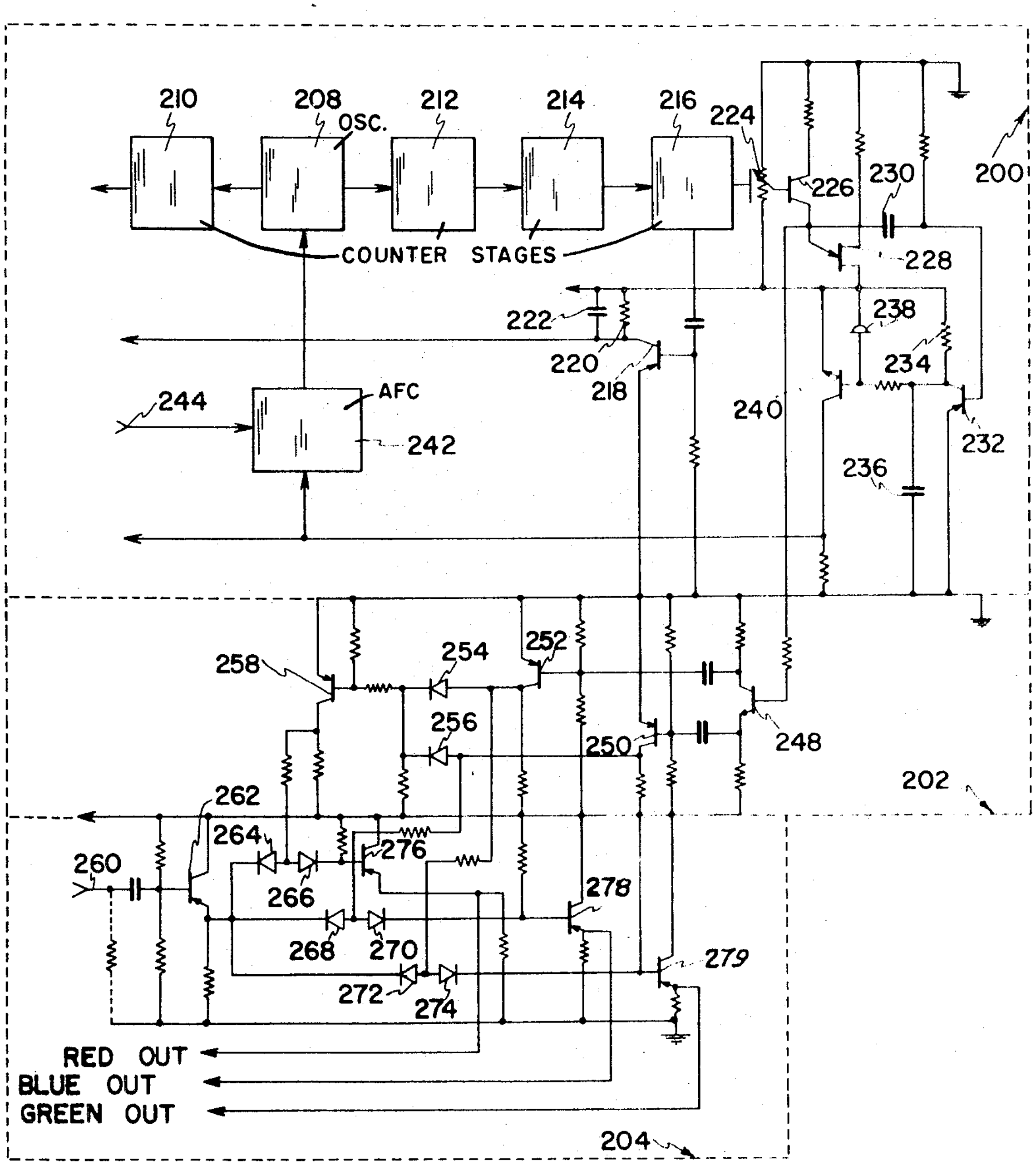
FIG. 11*a* schematically depicts a camera video gating and sync generation system which processes sequential video signals and segregates the signals into three separate color channels.

In FIG. 11*a* there is shown an elementary diagram partially in schematic and partially in block, of one complete embodiment of sequential color electronics. The portion enclosed within dotted box 200 comprises a 2:1 interlace synchronizing generator with appropriate pulse shapers and AFC, while the portion within dotted box 202 comprises color switching logic. The portion within dotted box 204 provides for color video gating and processing. As will be described later, the part of FIG. 11*a* within box 200 may be replaced by that within a box 580 (FIG. 23*a* ) to provide for remote color decodification, as at long cable, microwave or video tape recorder output.

The synchronizing generator 200 comprises a suitable conventional oscillator 208 which develops a twice horizontal frequency 2Hz. signal which feeds a 2:1 counter and/or buffer stage 210. The stage 210 couples suitable horizontal drive pulses into camera horizontal sweep forming circuitry. The 2Hz. master oscillator 208 signal is also directed to the first in a series of counter stages 212, 214 and 216, preferably with countdown rates of 5:1, 7:1 and 5:1, respectively. The operation of these counters is similar to that to be described below in conjunction with the final 3:1 stairstep counter. In the present art, these latter stages often number four, with countdown rates of 5:1, 7:1, 5:1 and 3:1, although various synchronizing standards necessitate other counts and/or orders.

A sample trigger signal is taken from the counter 216 (which counts 5:1 in the example) and coupled into a shaper/amplifier stage 218. Shaper/amplifier 218 in conjunction with resistor 220 and capacitor 222, forms a train of pulses at three times the usual vertical sweep rate in such manner as to produce vertical sync at this higher frequency.

The above-mentioned signal from counter 216 is also coupled into a special 3:1 stairstep counter incorporating bias control 224 for selection of count (step) number through variance of DC pedestal present at the base of driver stage 226.

In a counter of this type, each incoming trigger pulse, as from the preceding stage, adds another step to the stair voltage waveform present upon the emitter of unijunction transistor 228 across capacitor 230. When the stairstep amplitude has sequentially risen to a predetermined level, unijunction transistor 228 "fires," effectively shorting out the stairstep signal and emitting a new trigger pulse to the following stage, in this mentioned case, to shaper/amplifier 232, which forms a suitable drive pulse at vertical scan rate, utilizing RC circuit comprising components 234 and 236 and tunnel diode 238 discharge to feed output amplifier 240. Pulses from this latter stage, in addition to feeding camera vertical scan forming circuitry, are also coupled into automatic frequency control circuitry 242 which relays an error correction signal to master oscillator 208, thus keeping generator frequency in synchronism with the 60 hertz AC line or other incoming reference signal at 244.

Figure 11B:
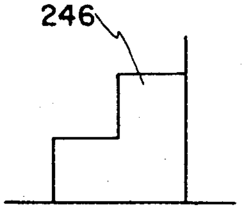
FIG. 11*b* is a schematic graph depicting a certain type of stairstep waveform.

With reference to box 202, a sample of final counter stairstep waveform 246 as seen in FIG. 11*b* is coupled into high impedance field effect transistor stage 248 which feeds buffered 0° and 180° phase stairstep components into separate overdriven gate driving amplifiers 250 and 252, the latter forming "on" signals to pass through green and blue video train segments, respectively. Samples of amplifier outputs of the two amplifiers 250 and 252 are respectively directed into diode coincidence gates 254 and 256, the resulting component feeding overdriven, gate driving amplifier 258 which forms the red video segment "on" signal.

With reference to box 204, sequential video train incoming at 260 from the conventional camera video amplifier chain is directed through emitter-follower stage 262 which parallel inputs three diode gate systems 264, 266 and 268, 270 and 272, 274. Each gate system output is directed through respective separate emitter-followers 276, 278 and 280 and/or suitable video amplifier stages constituting red, blue and green video channel output drivers, respectively. Gate systems 264, 266 and 268, 270 and 272, 274 receive separate "on" signals from the appropriate color switching logic stage as set forth above.

It can be seen that in this manner, a sequential video train becomes color codified or gated; i.e., alternately coupled by color field segments into appropriate color video channel outputs. If the incoming color train were line sequential in nature, color gate systems 264 through 274 would be driven by line rate switching logic signals and channelled to appropriate outputs in a manner similar to that described.

Camera Modifications, Specific

Figure 12:
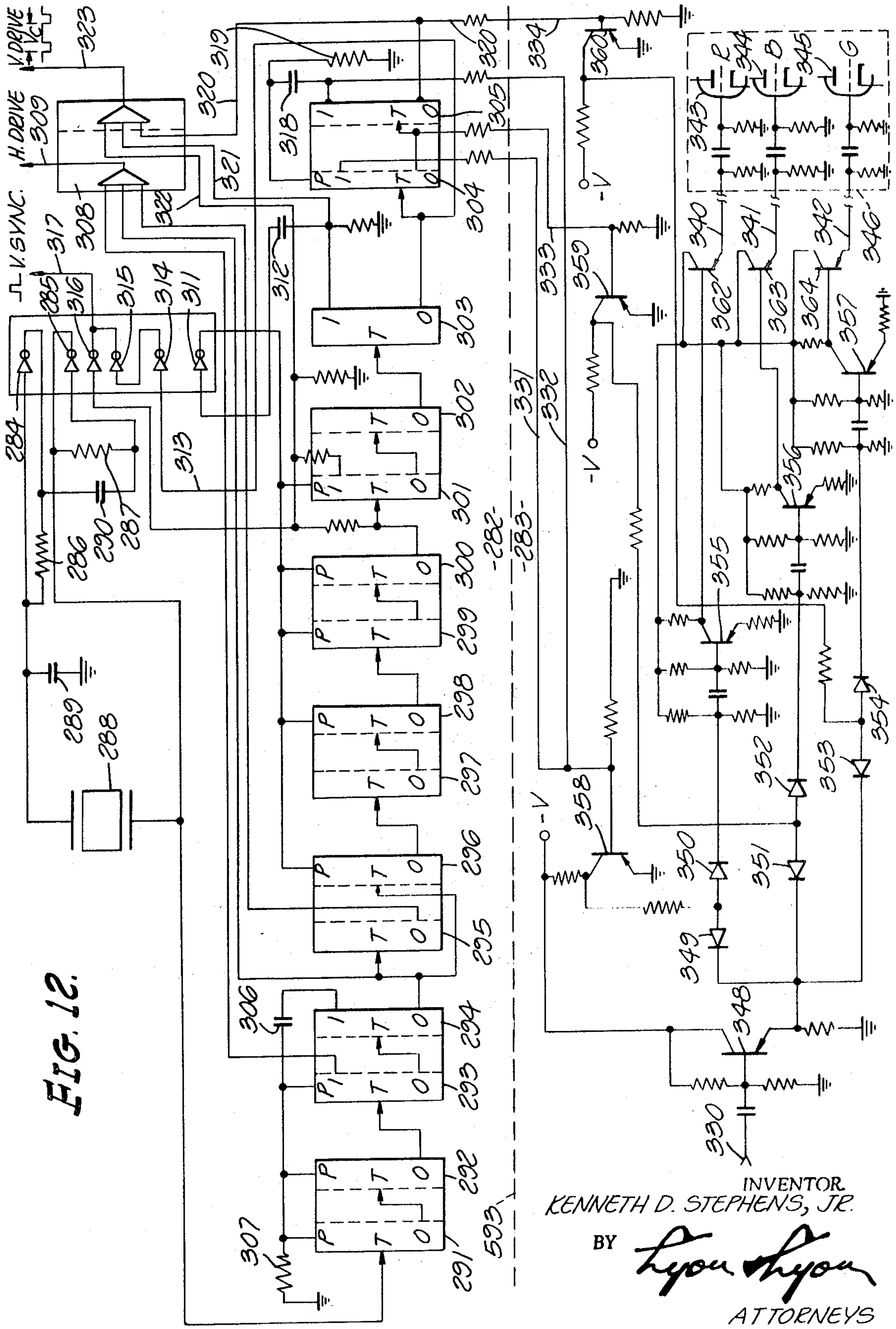
FIG. 12 is a schematic diagram of a preferred sync generator and color video gating logic for supplying three separate color signals to the color cathode-ray tube of a monitor.

FIG. 12 is a block diagram of a logic and synchronization circuit preferred for the operation of either a conventional television camera, such as General Electric Model TE20, or for a camera designed as a color unit. This circuit includes a sync generator circuit 282 and a video gating and processing logic circuit 283. With this arrangement, the camera is caused to operate at a vertical scan frequency of 60 hertz, although it will be appreciated that in view of the foregoing and subsequent discussions other scan frequencies can be employed.

Considering first the sync generator 282, inverter stages 284 and 285 are shunted by respective resistors 286 and 287 to act as feedback amplifiers. A suitable frequency crystal (such as approximately 315 kilohertz) 288 is made to sustain oscillation by the feedback amplifiers. A capacitor 289 assures fundamental (first harmonic) operation by shunting higher order harmonics to ground, an a capacitor 290 blocks DC while passing the desired AC (oscillation) component.

Pulse rise and fall times from the oscillator are suitable to directly couple into logic circuitry; therefore, the output of the oscillator is connected to the toggle (T) input of a first flip-flop 291 of a series of flip-flops 291 through 305. The flip-flops 291, 292, 293 and 294 are connected in binary fashion with suitable preset (P) input blocking through a capacitor 306 and a resistor 307 to provide precise 9:1 countdown. A countdown of this nature is desirable to maintain proper operation of the crystal 288 such that small size and low cost can be afforded. The output of the 9:1 counter 291–294 is coupled into two other counter series, a divide-by-two flip-flop counter 295 and a divide-by-195 counter comprising flip-flops 296–303. The output of the former divided-by-two counter (zero or not output of flip-flop 295) is directed through a noninverting amplifier 308 in conjunction with narrower output pulses from earlier flip-flop stages 293 (one output) and 294 (zero output) for the formation of correct impedance, polarity and duration horizontal drive pulse information (at approximately 17,500 hertz) which is applied to the camera by an output line 309. The output line 309 is coupled to the horizontal drive input of the camera sweep circuitry. The amplifier 308 and an amplifier 310 may be two sides of a conventional dual three input noninverting buffer amplifier.

Additionally, a blocking output from flip-flop 303 is fed to the preset (P) inputs of the flip-flops 296 and 298–301 to ensure correct 195 countdown. This "preset" pulse preferably is routed through an inverter amplifier 311 to ensure adequate fan out to all cooperating flip-flops, and a capacitor 312 serves as a differentiating component. The 180 hertz output out of the divide-by-195 counter is coupled from the zero or not output of the flip-flop 303 along a line 313 to camera vertical sync noninverting amplifier stage 314–315. The output of the flip-flop 300 is coupled through an inverter-amplifier 316 to the output of the inverter 315 and an output line 317. The inverter-amplifiers 315–316 act as a coincidence gate to ensure proper pulse width of the positive-going 180 hertz vertical sync pulses on the line 317.

Additionally, this same 180 hertz signal on the line 313 is fed to the toggle (T) input of the flip-flop 304. This flip-flop 304 in conjunction with the flip-flop 305 and suitable blocking capacitor 318 and resistor 319 form a final divide-by-three counter circuit to provide a 60 hertz output on a line 320. The 60 hertz output of this counter circuit is applied by the line 320 to the second side 310 of dual noninverting amplifier along with an input on a line 321 from the divide-by-256 counter chain and an input on a line 322 from flip-flop 300 to ensure that the correct pulse width appears at the output line 323. This line 323 is routed to the camera vertical drive circuits and forms the color phase codification signal $V_c$ which will be discussed shortly in conjunction with the description of FIG. 14. It is a special three-field-rate pulse.

The video gating and processing logic circuit 283 receives the camera video on an input 330 along with signals from the sync generator 282 on lines 331–334 through appropriate isolation resistors. The logic circuit 283 supplies output signals on lines 340–342 for controlling respective tubes 343–345 which in turn directly control the red, blue and green screens of a color cathode-ray tube in a conventional color monitor 346 or the like. An emitter-follower stage 348 accepts the sequential video train on the input 330, and this video train is separated into its three color signals by dual diode gates 349–350, 351–352 and 353–354. These gates respectively pass red, blue and green components or segments to respective amplifier stages 355, 356 and 357, respectively. As is apparent, these dual diode gates are controlled by the gating or switching signals on the lines 331–332, 333 and 334 from the sync generator circuit 282. Thus, lines 331–332 are coupled by a transistor 358 to the gate pair 349–350, the line 333 is coupled by a transistor 358 to the gate pair 349–350, the line 333 is coupled by a transistor 359 to the gate pair 351–352, and the line 334 is coupled by a transistor 360 to the gate pair 353–354. At any one instant only one gate pair is in the "on" state, each pair receiving the proper switching signal to correspond to one certain color component signal. The gating color representing signals are gated sequentially by the respective gate pairs to the respective transistors 355–357. The outputs from these latter transistors are coupled to transistors 362–364 to supply the color component signals to the respective output lines 340–342. These lines are coupled in any suitable manner to the monitor 346.

Camera Summary

Figure 13:
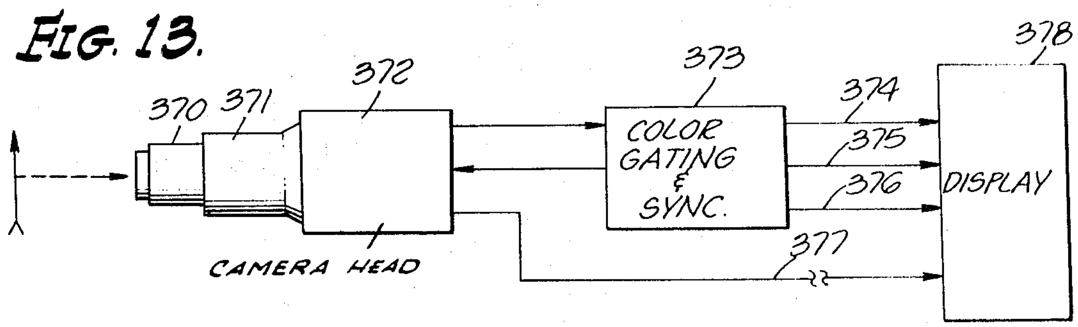
FIG. 13 is a block diagram generally illustrating a camera and gating logic in accordance with the foregoing figures providing separate blue, red and green outputs to a color display device.

FIG. 13 is a block diagram which essentially summarizes the foregoing discussion pertaining to camera modifications. FIG. 13 illustrates a conventional television lens system 370 feeding into special color optics 371 discussed previously in conjunction with the discussion of FIGS. 5 and 6, and a camera head 372 which incorporates conventional video amplification and processing circuitry as well as scan circuitry adaptable to one or more rates of vertical sweep, for example, 20, or 60 hertz. Alternatively, the color optics 371 may include "extended" or "remote" optics comprising the optics of FIG. 5 or 6, and a modified camera, with the camera head 372 including a black-and-white display and a camera viewing the display, for purposes which will be described subsequently in connection with FIG. 25. Color video gating and synchronization circuit 373 is coupled with the camera head 372 and provides suitable outputs 374 through 376 for blue, red, and green video signals. The camera head 372 usually provides on a line 377 a synchronization pulse train for properly locking the video display device 378.

Encoding Methods; Preliminary Discussion

Figure 14:
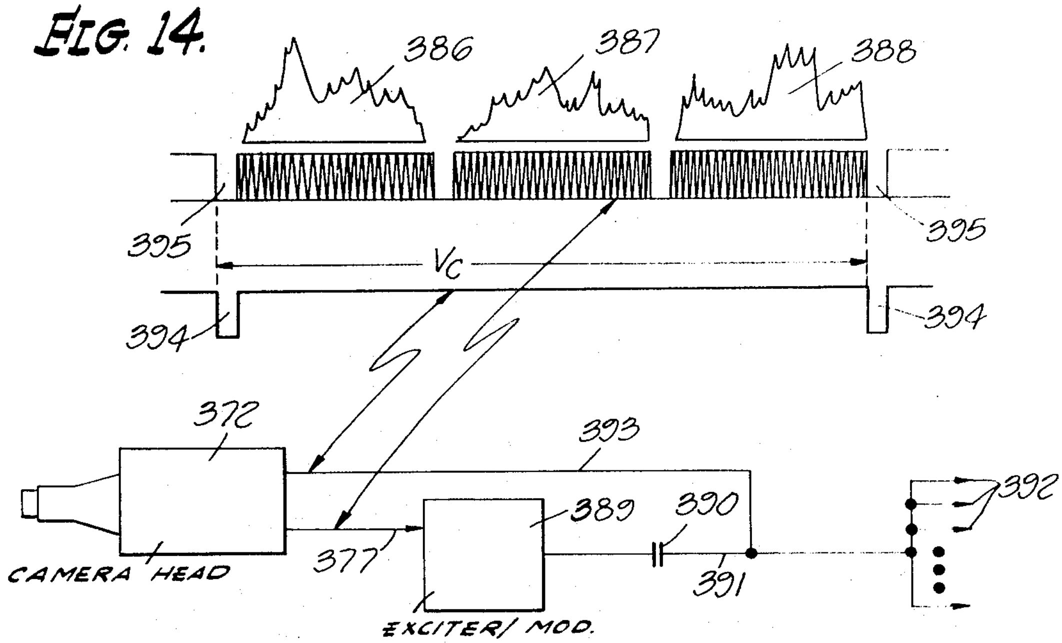
FIG. 14 is a block diagram and waveform of a camera encoder arrangement for direct wire coupling to a display device, and is suitable for use with a modified television receiver or monitor such as that illustrated in FIGS. 15*a* and 15*b*.

Turning for the moment to FIG. 14, one method of direct color phase sequencing for a color television receiver or monitor is illustrated wherein the display device serially exhibits each of the primary color elements transmitted from the camera head 372 in exact synchronism with camera operation. This is a camera and encoder system for direct line (or cable) usage with a display device, sync being added on the line. There are displayed a blue video field 386, a red video field 387, and a green video field 388 corresponding to the exact time interval (preferably for example, one-sixtieth, one-twentieth or one one hundred-eightieth of a second) being transmitted by a sequential video output cable 377 such as earlier described in conjunction with a discussion of FIG. 13. The cable is coupled to a conventional television RF exciter/modulator circuit 389 suitable for black and white or color which in turn emanates RF through a capacitor 390 to a distribution cable 391. The cable 391 is coupled to a number of lines 392 which may be directly coupled with color monitor or color receivers such as the receiver in FIG. 15 which will be described shortly. Also emanating from the camera 372 over a separate cable 393 is a special three-field-rate pulse 394 (hereinusually referred to as $V_c$ ) occurring at a particular frequency (one-sixtieth second in the example of FIG. 12 and one-fortieth second in the example of FIG. 15), and shown in correct timing synchronism with the receiver vertical retrace information 395 appearing with the composite sequential video over line 391. One suitable source of color-phase information appearing on the cable 393 is the vertical drive output of the camera head 372. The cable 393 is directly coupled to the cable 391 at the far side of the DC bypass capacitor 390 as shown, such that each color television display device coupled to the lines 392 has direct access to the color-phase pulse 394.

It should be apparent from the foregoing description that through modification of the camera and/or display device such that they operate at a particular ratio (preferably one-to-three ratio) as described earlier, and through the use of the rate pulse 394 a conventional black-and-white camera with modified optics as described can be used either with a conventional or modified color receiver or monitor. If the vertical scan rate of the camera is 20 hertz, no modification of the vertical scan rate of the display device is required and only a suitable circuit for discrimination of the rate pulse 394 and proper gating of the color signal to the CRT are required. If the camera vertical sweep rate is higher, modification of the display device is required to increase the vertical sweep rate of the device to maintain the desired frequency ratio (e.g., one-to-three).

Receiver Modifications, General

Considering first a conventional prior art color television receiver, it is well known that the antenna or similar source of RF energy feeds a tuner. The tuner feeds signals into an intermediate frequency amplifier which in turn directs signals to an audiofrequency detection and amplification system and to a video detection and amplification system. The final amplification stage in the sound system is coupled to one or more speakers, and the final stages of the video amplification system are directed to the luminance forming elements associated with a color cathode ray tube, usually appearing across the cathodes of the tube. Signals in the video amplification system are directed to a synchronization pulse separator which feeds a vertical scan forming system and a horizontal scan forming system. These latter systems direct scan voltages of proper amplitude geometry and duration to the cathode ray tube through a vertical yoke and a horizontal yoke. Also emanating from the video amplifier system are signals directed to circuitry for the detection of, and synchronization with, NTSC color information. This latter circuit in turn directs video information to a video amplifier and color matrix circuit which directs television primary color video segments to the appropriate elements in the cathode ray tube, usually the first screen grids.

As noted earlier, color television systems constructed according to the teachings of the present invention usually employ a one-to-three vertical scan frequency ratio between the camera and receiver. Also as earlier noted, the camera can be modified to have a 20 hertz vertical scan frequency in which case no modification of the receiver is required. However, where a different camera vertical scan frequency is desired, for example 40 hertz, it is necessary to modify the receiver. There is described below a relatively simple approach for modifying a conventional receiver which allows easy manual control thereof for receiving conventional programs on the usually received channels and for receiving field sequential color according to the present invention on an unused channel.

As will be described later, the receiver includes a specially modified channel selector knob which operates a switch bank when turned to a blank channel. The switch bank controls the operation of certain circuits within the receiver. The pertinent circuitry thus activated is found in the vertical sweep section affecting the vertical size circuit and the vertical sweep rate (vertical hold) circuit. Also activated is a special ring counter or similar gating logic circuit having outputs coupled with the lines from the color matrix circuitry to block out two of the color channels within the cathode-ray tube while not affecting the third, and in this manner allowing passage of each of the three primary colors in a serial fashion directly corresponding to the rate and color-phase timing of the incoming field sequential color video train. A specific example of the modification of a conventional state of the art color television receiver as well as the necessary switching and gating logic is given below.

Receiver Modifications, Specific

Figures 15A, 15B:
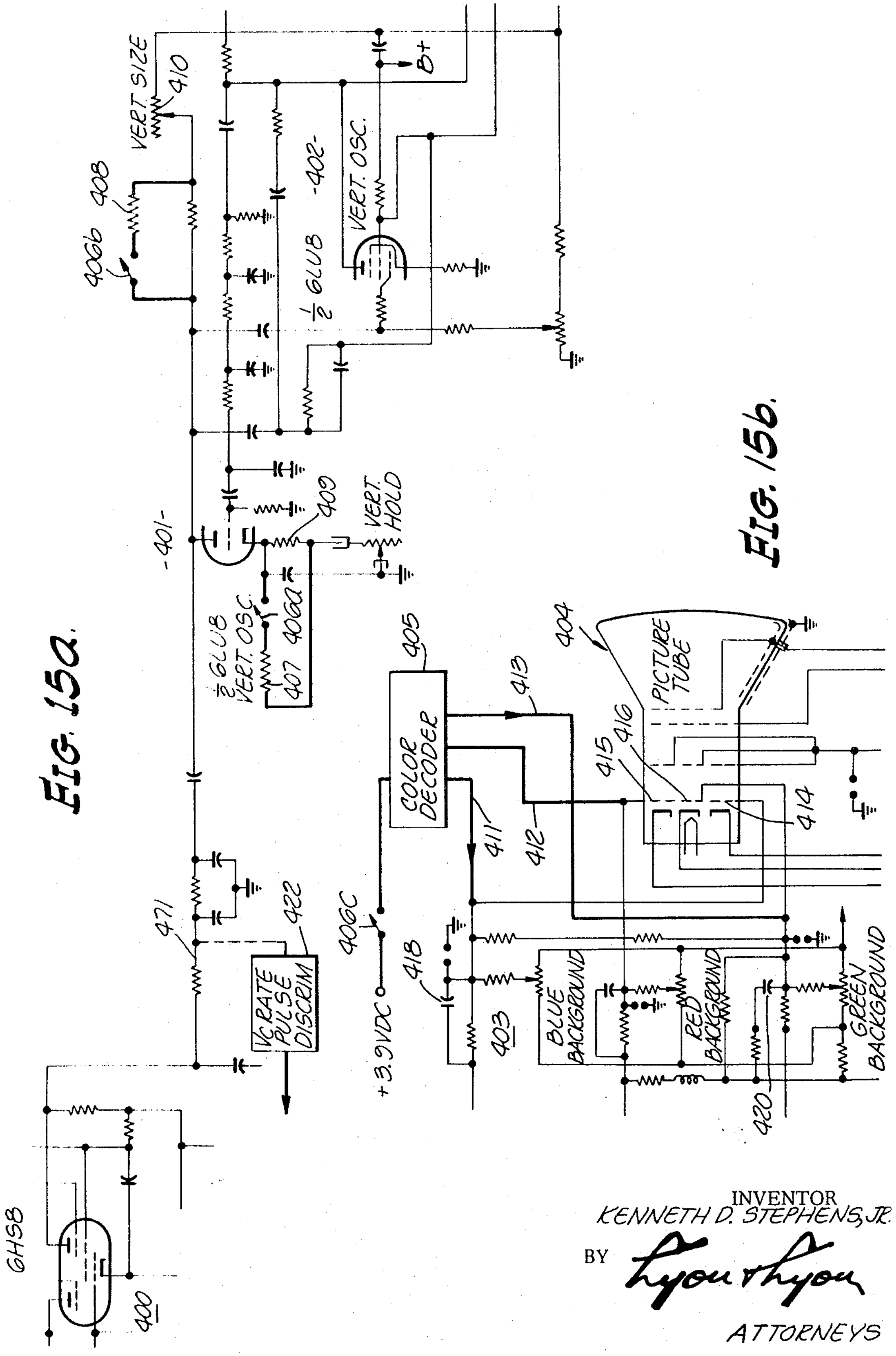
FIGS. 15*a* and 15*b* illustrate circuit modifications in a conventional color television receiver to allow the same to operate at an increased vertical scan rate, such as 120 hertz for reception of field sequential color.

FIGS. 15*a* and 15*b* illustrate modifications to a conventional color television receiver to allow the same to operate at a higher vertical scan rate, for example, a 120 hertz scan rate. FIGS. 15*a* and 15*b* are portions of the schematic of an Admiral Corporation Model C 8006THD8 receiver, chassis No. 6H10–H1063. FIG. 15*a* illustrates the noise gate, sync separation and gated AGC stage 400, the vertical oscillator 401 and the vertical output stage 402 of this receiver; and FIG. 15*b* illustrates the color matrix 403 for the cathode ray tube 404. A color decoding logic circuit 405 also is shown in block in FIG. 15*b*. Three switches 406*a*, 406*b* and 406*c* are shown in FIGS. 15*a* and 15*b* and comprise a switch bank 406 operated by the channel selector knob of the receiver.

It should first be noted that the camera vertical scan rate in this example is 40 hertz. It is merely necessary to revise the counter configuration in FIG. 12 so that the first four flip-flops 291–294 provide a 10:1 countdown. The next flip-flop 295 divides by two as before. An additional flip-flop is added to the next group of flip-flops 296–303 to provide a divide-by-263 counter, and the final flip-flops 304–305 divide by three. In this manner, the output line 317 provides a 120 hertz output and line 323 provides a 40 hertz output.

Modifications in the receiver are made in the vertical scan circuitry in the areas of the vertical oscillator 401 and the vertical sweep output 402. The two single-pull single-throw switches 406*a* and 406*b* of the switch bank 406 are used to insert respective parallel resistors 407 and 408 which affect vertical oscillator frequency (vertical hold) and vertical size (picture height), respectively. In the present embodiment, the frequency of the vertical oscillator 401 is altered in this manner from 60 hertz to 120 hertz through the insertion of the resistor 407 across cathode resistor 409 of the vertical oscillator 401. However, this action changes picture height to one-half the normal value. Therefore, the resistor 408 is inserted upon closure of the switch 406*b* in series with the receiver "-vertical size" control 410 in the vertical output stage 402 to restore picture height to a proper value.

The third switch 406*c* of the switch bank 406 is used in the video amplifier/matrix section 403 of the receiver to apply an energizing DC voltage to the color decoder logic 405. This logic circuit is directly coupled through three output lines 411 through 413 to the respective blue, red and green cathode-ray tube screens 414 through 416, respectively. These lines sequentially place a positive voltage on each screen in turn to allow the passage of the blue, red and green video field segments in exact synchronism with the original transmission. To ensure proper screen switching, color video series capacitors 418 through 420 are substantially decreased in value to decrease the amount of energy stored thereby so as to enable a fast and sharp switching action to take place. A $V_c$ rate pulse discriminator 422 is shown coupled between the noise gate, etc., stage 400 and the vertical oscillator 401 for detecting 40 hertz pulses initially generated in the camera circuitry. This discriminator allows internal discrimination of 40 hertz pulses codified on a video train without necessitating a direct wire connection to carry these pulses as will be described subsequently in connection with a discussion of FIG. 17. Of course, the switch bank 406 is not required in cases where the receiver is designed only to receive field sequential color.

It will be apparent that the switch bank 406 may take any of many different forms. In its simplest form a channel selector knob encloses a miniature switch bank appropriately mounted to be activated by the knob as it is turned to the desired channel or channels pertinent for reception of the field sequential color television signals. The switch consists merely of three single-pull single-throw switches as illustrated in FIGS. 15*a* and 15*b*.

Figures 16A, 16B:
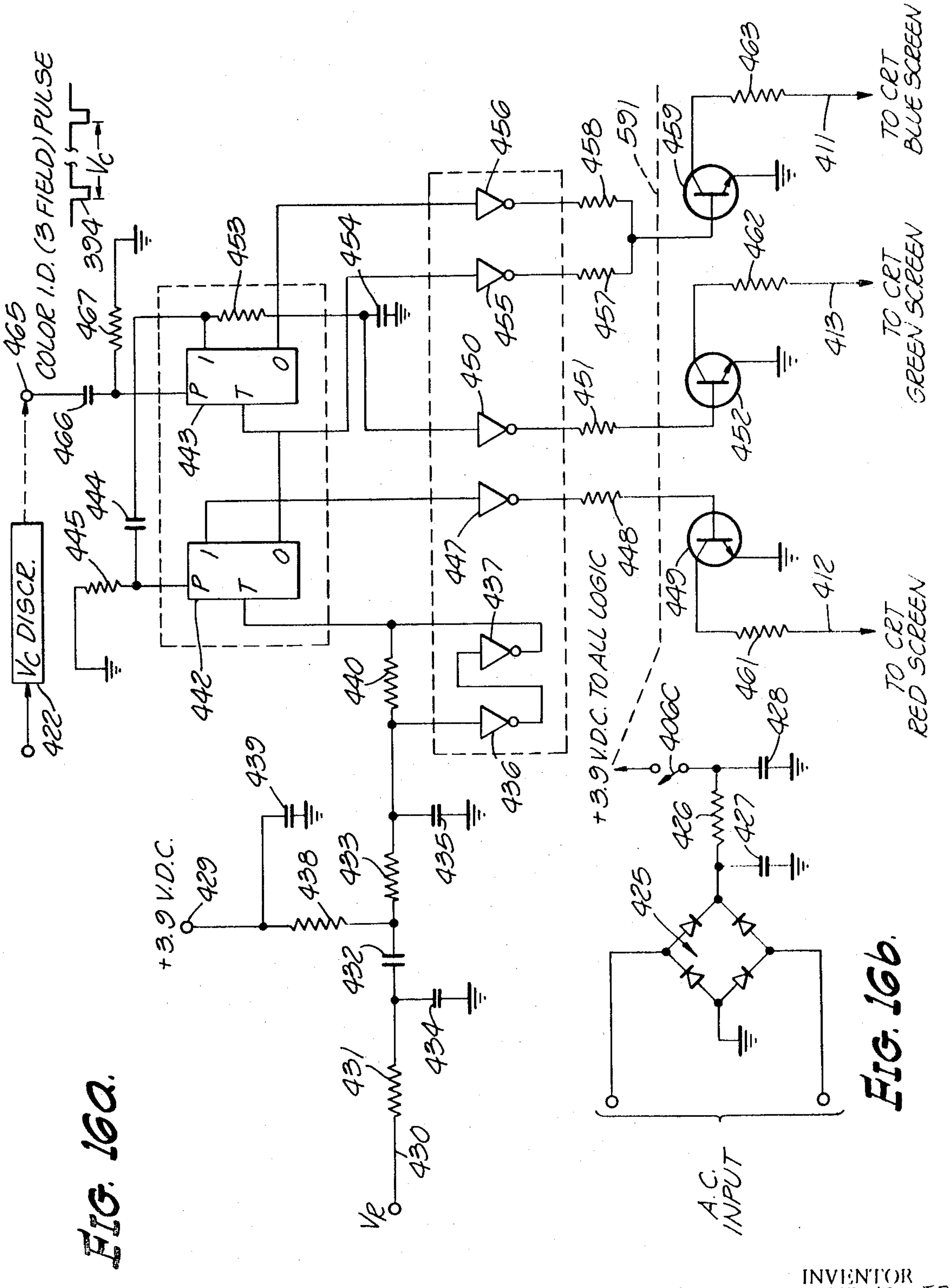
FIGS. 16*a* and 16*b* illustrate a color decoder for use with a modified conventional receiver or monitor for allowing reception of sequential color by wire or transmission.

FIGS. 16*a* and 16*b* illustrate the color receiver decoder logic 405 in greater detail. This circuit may be powered by a bridge rectifier 425 (FIG. 16*b*) coupled to a nominal AC source (may be coupled across the filament leads of the cathode-ray tube 404). One side of the bridge 425 is grounded, and the positive DC side is directed through voltage dropping and smoothing resistor 426 surrounded by smoothing capacitors 427 and 428 which are coupled to ground. The output of this filter section is coupled through the switch 406*c* to the remainder of the circuit in a conventional manner, i.e., to terminal 429 and to the amplifiers and flip-flops therein.

A line 430 receives the $V_r$ pulses, which may be derived from the high side of the receiver vertical yoke, and supplies the pulses to a series resistor 431 and capacitor 432. These components, operating in conjunction with a series resistor 433 and parallel capacitors 434 and 435, constitute an effective vertical pulse discriminator circuit suitable for interface coupling into series coupled inverters 436 and 437. Proper input bias to the inverter 436 is maintained by a resistor 438, having a power supply bypass capacitor 439 coupled therewith. Positive feedback is employed in series inverters 436 and 437 by means of a resistor 440. These elements 436, 437 and 440 are suitable for the formation of a high rise time trigger pulse suitable to be fed to the toggle (T) input of a flip-flop 442. This flip-flop normally operates as a binary (2:1) counter as does a complementary flip-flop 443. With the not (0) output of the flip-flop 442 directed into the toggle (T) input of the flip-flop 443 the combination would normally count 4:1. However, by means of a coupling capacitor 444 and resistor 445 coupled to the preset (P) input of the flip-flop 442, the total count is made to be 3:1 in the two flip-flops 442–443. The one (1) output of the flip-flop 442 goes positive to negative in the ratio of 1:3 and is suitable for coupling through an inverter stage 447 and series resistor 448 to the base of a "red" switching high-voltage NPN-transistor 449. Likewise, the one (1) output of the second flip-flop 443, while removed in phase by 120° from the previously mentioned positive output of the flip-flop 442, also varies positive to negative in a ratio of 1:3 and is similarly coupled through an inverter 450 and series resistor 451 to the base of a "green" switching transistor 452. A series resistor 453 and bypass capacitor 454 isolate the input of the inverter 450 from high-frequency switching transients. The not (O) outputs of the two flip-flops 442 and 443 are connected through respective inverters 455 and 456 to series resistors 457 and 458. These resistors are connected together to the base of a "blue" high-voltage switching transistor 459 to form a 1:3 ratio switching pulse for the third 120° phase.

The high-voltage switching transistors 449, 452 and 459 are coupled to the proper screens of color cathode ray tube 404 through respective isolating series resistors 461 through 463. These resistors, as well as the base series resistors 448, 451, 457 and 458 are used to overcome the severe problem of interface between low-voltage (e.g., 3.9 volt) logic circuitry and the several hundred volt receiver elements.

Finally, the color phase pulse train 394 ($V_c$) as discussed earlier in connection with the description of FIG. 14 may be coupled through an input 465 and a capacitor 466 to the preset (P) input of the flip-flop 443. In conjunction with a shunt resistor 467, this arrangement enables 3:1 counting to remain constant at one color phase, operating in exact synchronism with the color video segments emanating from the camera 372 in FIG. 14. The $V_c$ pulses may be derived from the $V_c$ rate pulse discriminator 422 shown in block form in FIGS. 15*a* and 16, and shown schematically in FIG. 17 and described below.

Figure 17:
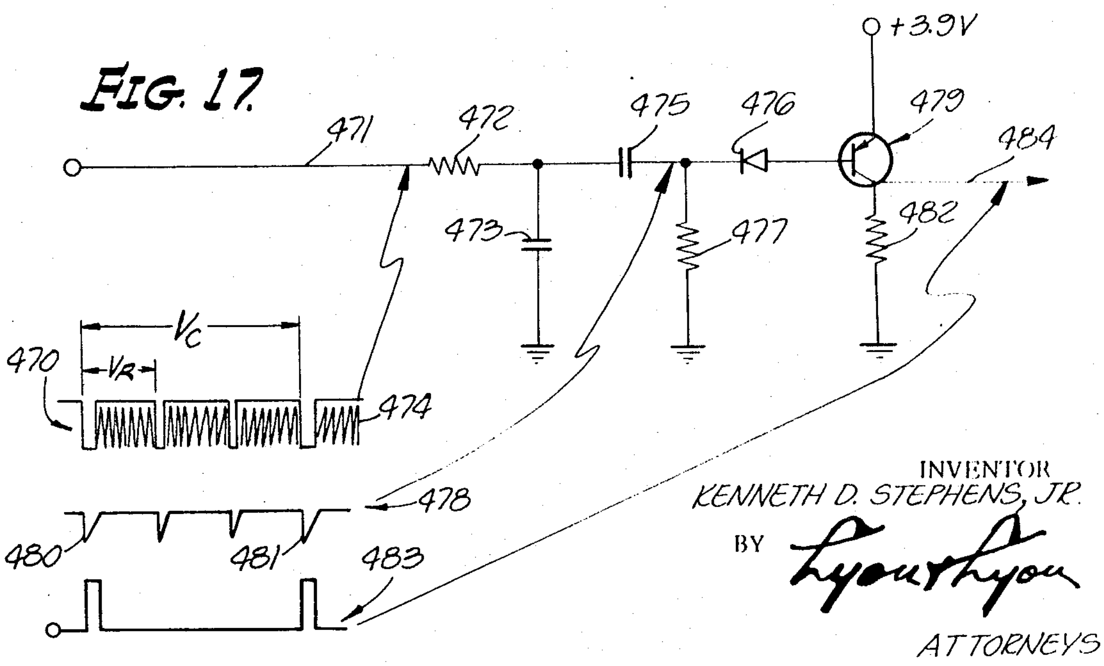
FIG. 17 illustrates a discriminator circuit for use with a receiver to provide internal discrimination of field rate synchronizing pulses without requiring the same to be coupled to an antenna line of the receiver.

It should be noted at this point that a conventional black-and-white type receiver employing a color CRT with suitable power supply and deflection means can be made through the addition of the receiver color decoder of FIG. 16, along with a suitable $V_c$ pulse discriminator as shown in FIG. 17, to receive field sequential color.

FIG. 17 illustrates a discriminator 422 mentioned briefly in the earlier discussion of FIG. 15*a*, which allows discrimination of $V_c$ rate pulses entirely within the receiver without requiring $V_c$ to be supplied to the receiver by cable as in the case with the camera system of FIG. 14. That is, this discriminator can be used where $V_c$ is transmitted by antenna, and the receiver will still maintain the proper color fidelity and proper color identification through the use of this internal discriminating circuit. In the arrangement shown in FIG. 14, this signal was multiplexed on the RF line and was directly coupled to the input 465 in the color logic circuit shown in FIG. 16.

Further Color Encoding Methods

In the proceeding description it has been assumed that the color identification pulse (also referred to as three-field-pulse train or $V_c$) is directly applied as such by an electrical conductor to the receiver. However, it will be apparent that these pulses can be suitably codified within the composite or noncomposite video train and applied either by cable or by antenna transmission to one or more receivers. There is already a discriminating circuit in conventional color receivers that feeds the vertical information to the vertical oscillator to maintain the oscillator on frequency and, thus, by multiplexing $V_c$ into the vertical pulses and retrieving the same by the discriminator 422 in FIG. 15*a* is a relatively simple manner.

An embodiment of the discriminator 422 is shown in FIG. 17 wherein composite video or stripped sync information 470 appearing on a line 471 in FIG. 15*a* and FIG. 17 is acted upon to retrieve $V_c$ pulses. A resistor 472 and a capacitor 473 are used to delete the horizontal component 474 of the signal 470. The resistor 472 also serves as an isolation resistor. A capacitor 475, which has a substantially larger (e.g., 10times) capacity than the capacitor 473 couples the vertical information to a diode 476 while the horizontal information is being shorted to ground by the capacitor 473. A waveform at the junction of the capacitor 475 and a resistor 477, illustrated typically as waveform 478, is similar to that necessary for the firing of the overdriven amplifier 581 in FIG. 23*a* for achievement of the pulse train depicted in FIG. 23*b*. However, in the present case the diode 476, resistor 477 and the base collector of the transistor 479 form a DC restoring circuit which clamps only on the most negative sync tips, that is the tips of the $V_c$rate pulses such as 40 hertz pulses 480 and 481 shown in FIG. 17. Thus, in this case only the 40 hertz $V_c$ pulses cause the transistor 479 to switch; whereas, in the arrangement of FIGS. 23*a* and 23 *b* switching takes place at the $V_r$ rate, i.e., all pulses 582 (FIG. 23*b* are counted, with the wider pulses 583 causing reset and consequently color-phase locking. The resistor 477 has a high value to establish an amount of bias through the diode 476 and transistor 479, and a resistor 482 has a nominal value to enable the transistor to effect full switching. The transistor normally is fully "off" and is switched fully "" to a full conduction state each time the $V_c$ pulse passes through the discriminator. The output pulses 483 appearing on an output line 484 then are applied to the input 465 of FIG. 16 through the capacitor 466 to the color logic, or color identification circuitry. It will be apparent that this arrangement eliminates the necessity of conducting the $V_c$ pulses by a line to the input 465 of the receiver as was described earlier in conjunction with the discussion of FIGS. 14 and 16. That is, for example, it is not necessary to directly couple the $V_c$ pulses by the line 393 in the arrangement of FIG. 14 directly to input 465. This is true in any instance where $V_c$ is properly encoded. Codified video (with $V_c$ ) also may be recorded on video tape for later playback through the use of the discriminator of FIG. 17.

Figure 18:
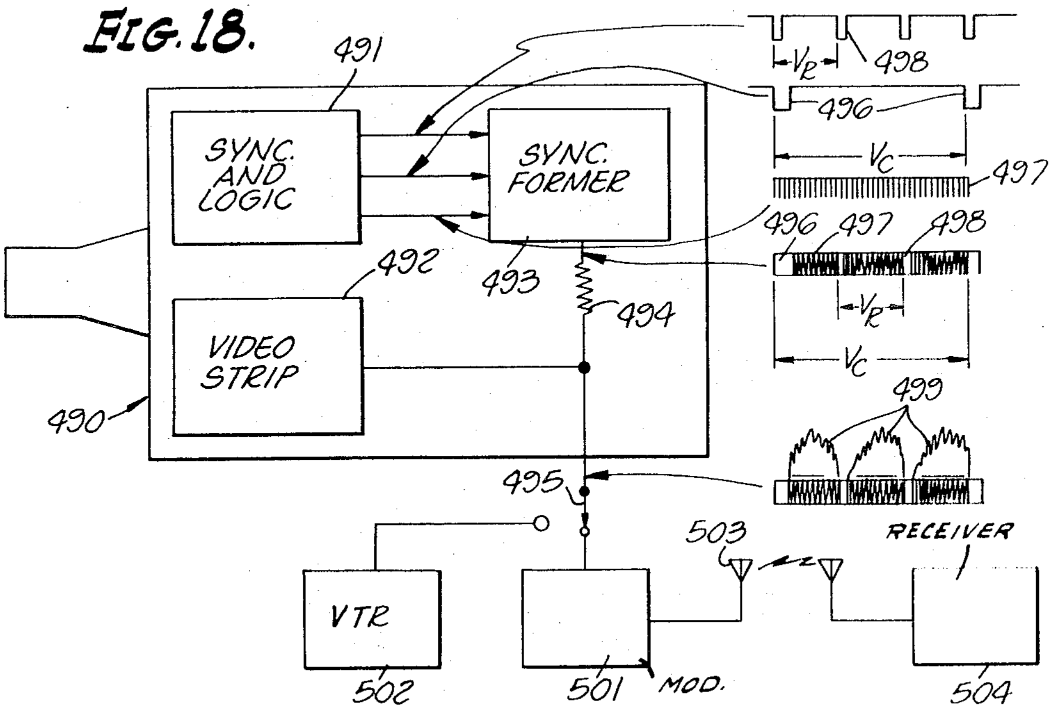
FIG. 18 illustrates a specific embodiment of a camera encoding system using a wide color rate identification signal ($V_c$)

FIG. 18 schematically illustrates another embodiment for color identification sequencing within a modified color television camera 490 such that receiver reproduction serially exhibits each of the three primary color elements transmitted from the field sequential color camera 490 in exact synchronism as in FIG. 14, and FIG. 22*a* to be described subsequently. However, in this embodiment, color sequence identification is accomplished through the encoding (codification) of information within the vertical interval period corresponding to every third video field emanating from the camera. This period is $V_c$ and may correspond, for example, to the camera vertical drive period. Relatively wide pulses are provided for $V_c$, and are particularly useful with the discriminator of FIG. 17. The camera 490 includes a sync and logic circuit 491, a video amplifier strip 492 and a sync adder 493. Normally the sync and logic circuit 491 feeds a vertical 498 and a horizontal 497 train of pulses to the sync former 493 such that the sync is passively added by means of a resistor 494 with the video information from the video amplifier strip 492 to provide a composite video signal as shown at an output line 495.

The sync and logic circuit 491 is modified in the vertical stages thereof to provide the pulses $V_r$ and $V_c$, $V_r$ preferably being at 120 hertz vertical sync signal and $V_c$ being at 40 hertz vertical sweep rate (or vertical drive) signal. The output of the sync adder 493 then is composed of a fairly wide $V_c$ pulses 496, conventional horizontal rate pulses 497, and the smaller vertical sync $V_r$ pulses 498. The video information 499 from the video strip 492 is directly added at the output end of the resistor 494 to provide the composite video signal on the output line 495 as shown. This signal can be coupled directly into an RF video modulator 501 which may be a conventional television RF exciter/modulator suitable for black and white or color, or alternatively the signal can go to a video tape recorder 502, or to any other conventional equipment which can handle black-and-white video information. The information may be transmitted from the modulator 501 through an antenna 503 to one or more television receivers 504. Information recorded by the recorder 502 may be ultimately played back or transmitted, as desired. In any case, proper color will be rendered at the receiver when used in conjunction with the modified receiver as depicted in FIGS. 15 and 16 along with a discriminator 422 as illustrated in FIG. 17 to detect the vertical sweep rate pulses $V_c$.

As an alternative to adding the $V_r$ and $V_c$ pulses in the sync adder 493, a conventional EIA sync generator may be modified to provide appropriate coded pulses which can be decoded at the receiver to retrieve the $V_r$ and $V_c$ information. As is known, a conventional EIA sync generator generates a plurality of pulses during the vertical interval, usually consisting of a six pulse equalizing train 507 (FIG. 19) of one polarity at the front porch of the vertical sync interval, a train 508 of six inverted pulses defining the vertical sync pulse interval, another six pulse train 509 of the first polarity defining the equalizing pulse interval, and then a train 510 consisting of a number of horizontal sync pulses (usually nine to 11 pulses) at the back porch of the vertical retrace period before the video information 511 again resumes. $V_c$ rate color identification can be imposed on every third vertical sync pulse train 509 through the addition of a number of extra vertical pulses, preferably an even number of pulses such as pulses 512 and 513. This addition of pulses results in a shift of the equalizing pulse train 509 by a proportionate time interval, and shortens the back porch interval defined by the pulse train 510, shown in FIG. 19 as pulse train 514; however, a sufficient number of horizontal pulses (eight to 10 pulses) still remain and are ample for proper receiver retrace blanking to take place. Examples of $V_c$ and $V_r$ codification for an industrial sync train is illustrated in FIG. 20 wherein $V_r$ and $V_c$ rates are defined by the relatively wide pulses shown, the $V_c$ vertical pulse defining a proportionately longer period then the $V_r$ intervals as depicted.

The modified EIA sync generator can be coupled to camera 490 of FIG. 18 either internally or externally. Preferably normal horizontal and vertical drive lines synchronize camera sweep, and an internal modification is made so as to provide a single output line with a mixed sync signal having the $V_r$ and $V_c$ codified signals along with the horizontal pulses all mixed together in one pulse train replacing the sync former 493. The resistor 494 then serves to add the pulse train to the video to provide the composite output. It will be apparent that all that is necessary is to properly codify the $V_c$ rate information such that a circuit in the receiver can detect this information. Thus, it is only necessary to provide a plurality of pulses from which a wider than normal vertical pulse can be derived, or to provide a single wide industrial type pulse at the $V_c$ rate. This pulse can then be discriminated from the composite train in any suitable manner, two examples of such discrimination being illustrated in FIGS. 17 and 23.

Figure 21A:
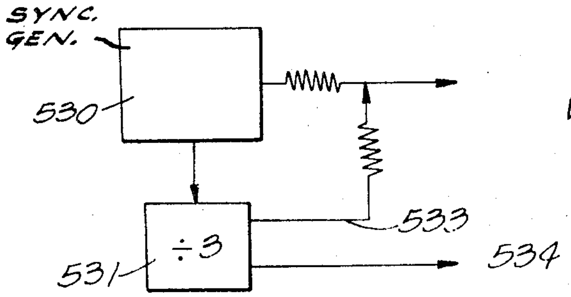
FIGS. 21*a* and 21*b* respectively depict one system of camera encoding of color video information on a single video train and a graph of a color identification pulse generated thereby.
Figure 21B:
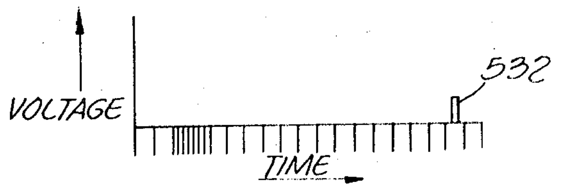

Another camera encoding arrangement which can be used, for example, with a conventional receiver, or a modified receiver of the nature of that in FIGS. 15*a* and 15*b*, is shown in FIG. 21*a*. This arrangement includes a sync generator 530, for which a sample 60 hertz vertical drive pulse emanates, coupled to a divide-by-three counter 531 which, for example, generates approximately 20 hertz camera vertical drive triggering on line 534 (where the receiver scan rate is 60 hertz) and adds a pulse identifiable with a certain color transition i.e., red to blue or blue to green, etc. A color identification pulse, such as 532 shown in FIG. 21*b*, is generated by the counter 531 and directed along the line 533 at the end of the period required to scan all three color fields. The identification pulse will trigger a gate or the like in the receiver which identifies the proper color signal. There is a place in the pulse train 514 of FIG. 19 where it is permissible to insert the pulse 532. In an alternate configuration for use in conjunction with industrial camera incorporating internal synchronization generations, the divide-by-three counter 531 may be used to form a broader vertical pulse at the given tricolor scan rate, which is easily identifiable by a color gate logic system, such as the one shown in FIG. 11.

Figures 19, 20, 22A, 22B:
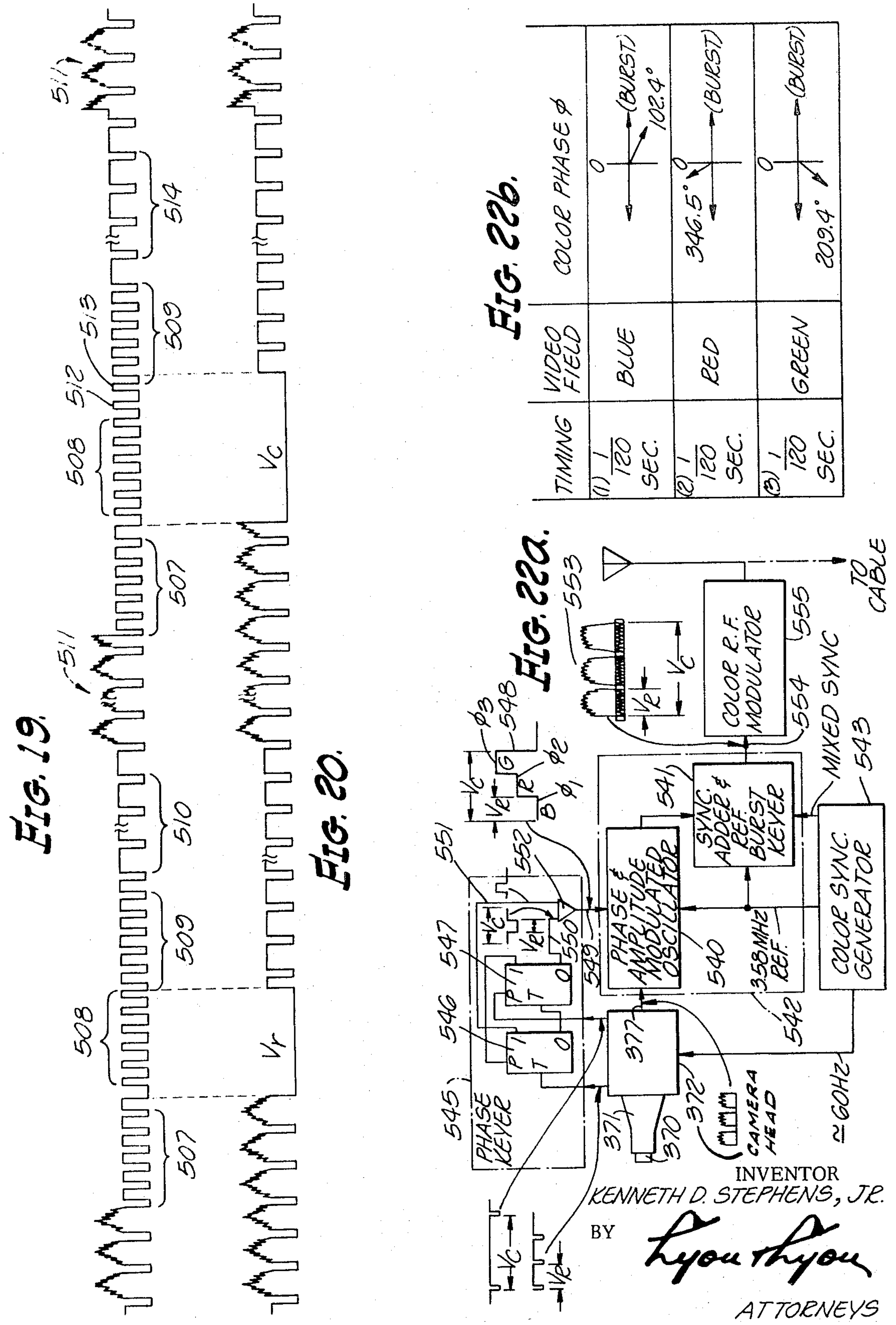
FIGS. 19 and 20 illustrate respectively modified EIA and industrial sync waveforms incorporating the $V_c$ and $V_r$ codification which may be generated by the system of FIG. 18.
FIGS. 22*a* and 22*b* respectively illustrate a camera block diagram and color phase vectors for a camera encoding system according to the present invention for use with conventional color receivers without requiring modification of such receivers.

FIG. 22*a* illustrates an embodiment of another color sequencing method at the point of origination such that the receiver serially exhibits each of the three primary color elements in exact synchronism, for instance as earlier discussed in connection with FIG. 14. The system in FIG. 22*a* works with conventional (NTSC) color receivers without requiring modification to color circuitry thereof. The camera 372 provides on output line 377 a noncomposite sequential video train which is applied to the input of a phase- and amplitude-modulated oscillator 540. This oscillator and a sync adder and reference burst keyer 541 may be standard subassemblies of a conventional colorplexer 542 which also includes a color matrix section (not shown) which is not used in this embodiment. A color sync generator 543 also is provided and references the basic sweep signals for the camera 372 so that the camera runs on proper sync standards. Conventional color sync generators generate at slightly under the 60 hertz vertical/15,734 hertz horizontal black-and-white standards. If the previously discussed 40 hertz vertical scan rate is desired, the 60 hertz output of the generator 543 may be converted to 40 hertz in any suitable manner, such as by doubling the 60 hertz to 120 hertz and dividing by three to obtain 40 hertz. Alternatively, counting logic could be used in conjunction with a crystal controlled oscillator such as that used in FIG. 12 to derive the 40 hertz signals.

The oscillator 540 is amplitude modulated by the noncomposite sequential train on the line 377, and is phase modulated by the output of the phase keyer 545. Two outputs, $V_r$ and $V_c$ are applied from the camera 372 to the phase keyer 545 to synchronize the operation of the keyer. These pulses from the camera are the vertical receiver rate pulse train $V_r$ which in the example is 120 hertz and which provides vertical sync for the receiver. The other pulse, $V_c$ is the 40 hertz vertical sweep rate or vertical drive. The train $V_r$ is applied to the toggle (T) input of the first pair of flip-flops 546 and 547 which are connected in a counter configuration. The zero output of the flip-flop 546 feeds the toggle (T) input of the flip-flop 547, and the one output of the flip-flop 547 is coupled back to the preset (P) input of the flip-flop 546 to provide a count of one in three in a manner similar to that described in connection with the flip-flops 442–443 in FIG. 16. A stairstep waveform 548 is formed on the output line 549 of the phase keyer 545, and is formed by the addition of the negative going one-third segment pulse and the positive going one-third segment pulse which is out of phase by 240°. These pulses are respectively applied to inputs 550 and 551 of an amplifier 552. The $V_c$ 40 hertz signal fed to the preset (P) input of the flip-flop 547 provides proper synchronization of the stairstep waveform 548 such that it always starts at a given color, for example blue. Thus, for example, the lowest voltage step of 548 may correspond to blue, the middle step to red, and the highest step to green. This stairstep signal 548 is fed to the oscillator 540 to phase modulate the same. That is, one oscillator phase is present at one stairstep level, another phase present at the next level, and a third phase at the final level as indicated by the vectors in FIG. 22*b*.

Accordingly, it will be apparent that phase modulation and amplitude modulation take place within the oscillator 540, and the output signal thereof is essentially the same as a conventional color signal. Vertical and horizontal sync then added from the color sync generator 543 and a reference burst is keyed in a conventional manner through the circuit 541 such that a normal color television signal train 553 of desired vertical and horizontal sync repetition frequencies is provided on an output line 554 to a color RF modulator 555. The output of the modulator 555 may be transmitted or applied by cable to color receivers.

Figure 23A:
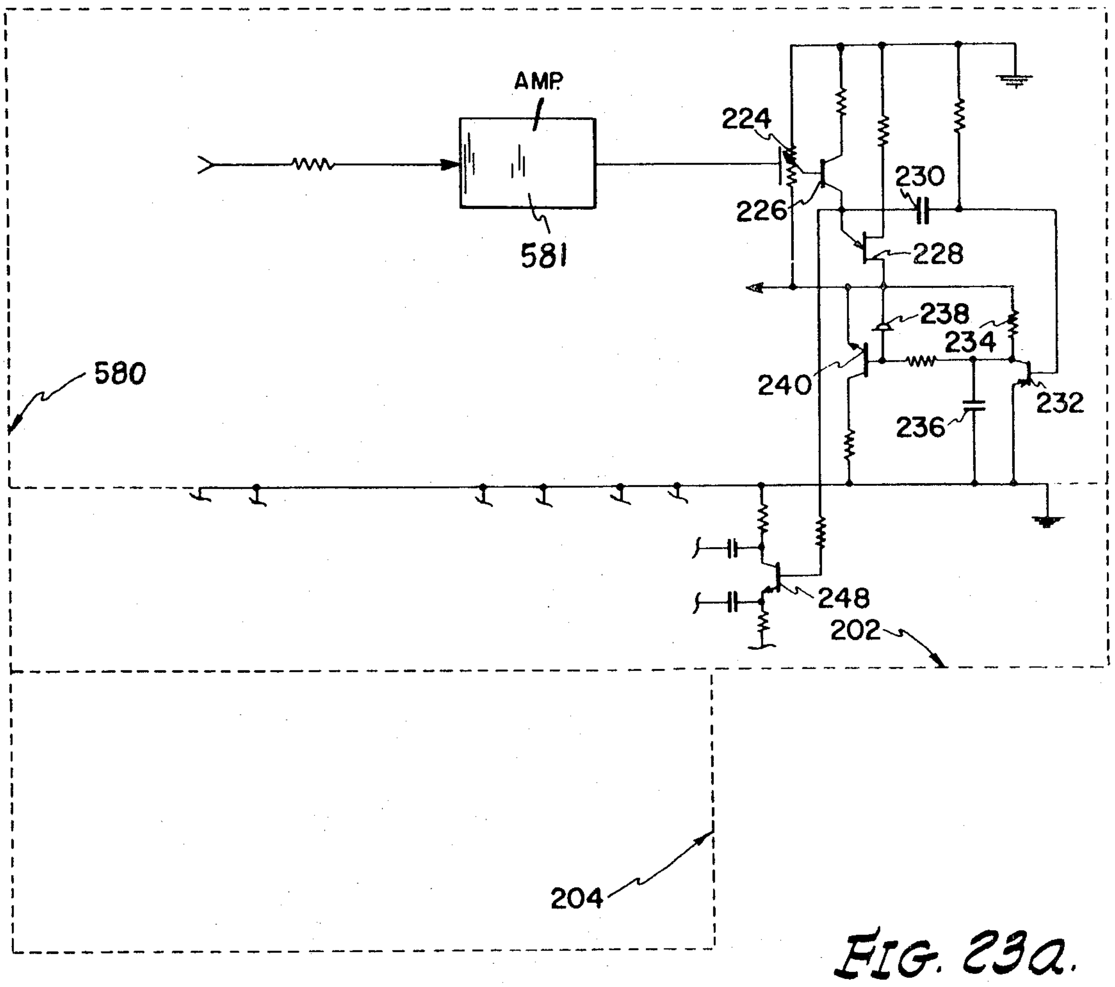
FIG. 23*a* is a schematic representation of a decoder system adapted to be used with display devices at the end of a remote line or at the output of a video tape recorder.
Figure 23B:
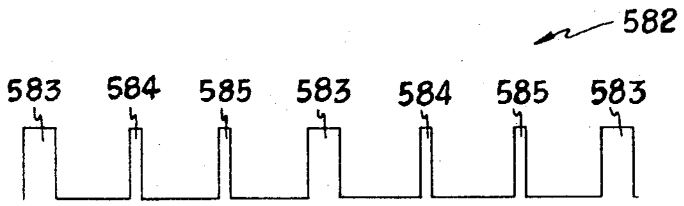
FIG 23*b* is a waveform diagram depicting the output signal from an overdriven amplifier in the system of FIG. 23*a*.

FIG. 23*a* illustrates a modification of the camera color logic circuit of FIG. 11 which was described earlier wherein block 580 is used in place of block 200 such that a sequential video input train is coupled into a sync-stripping overdriven amplifier stage 581, which is also made to discriminate in favor of vertical synchronizing information. The method video train is removed from the originating source, as by a long cable, microwave or the like. The output signal from overdriven amplifier 581, generally designated 582 in FIG. 23*b*, consists of inverted synchronization, chiefly containing vertical pulses occurring at the field sequential rate, as 180 hertz where the camera vertical rate is 40 hertz, and so forth. The broader pulses 583 signal the beginning of vertical scan which always precedes a certain color field, as for example green. The following vertical pulses 584 and 585 might then always precede red and blue, respectively, This set of pulses 583–585 is directed into aforementioned 3:1 stairstep counter which counts in the manner previously described in the discussion of FIG. 11, feeding a stairstep signal into color switching logic circuitry 202 to act upon video gating section 204 as described earlier.

Each broader vertical pulse 583 is of such nature as to "-five" stairstep counter unijunction stage 228 upon being coupled into the 3:1 counter circuit. Thus, this pulse will determine the phase of said stairstep signal, with reset portion always occurring upon arrival of a broad pulse 583, preceding the sequential video green field, in the example. In this manner, proper color channel codification will be achieved and maintained without need for external field codification information.

Figures 24, 25:
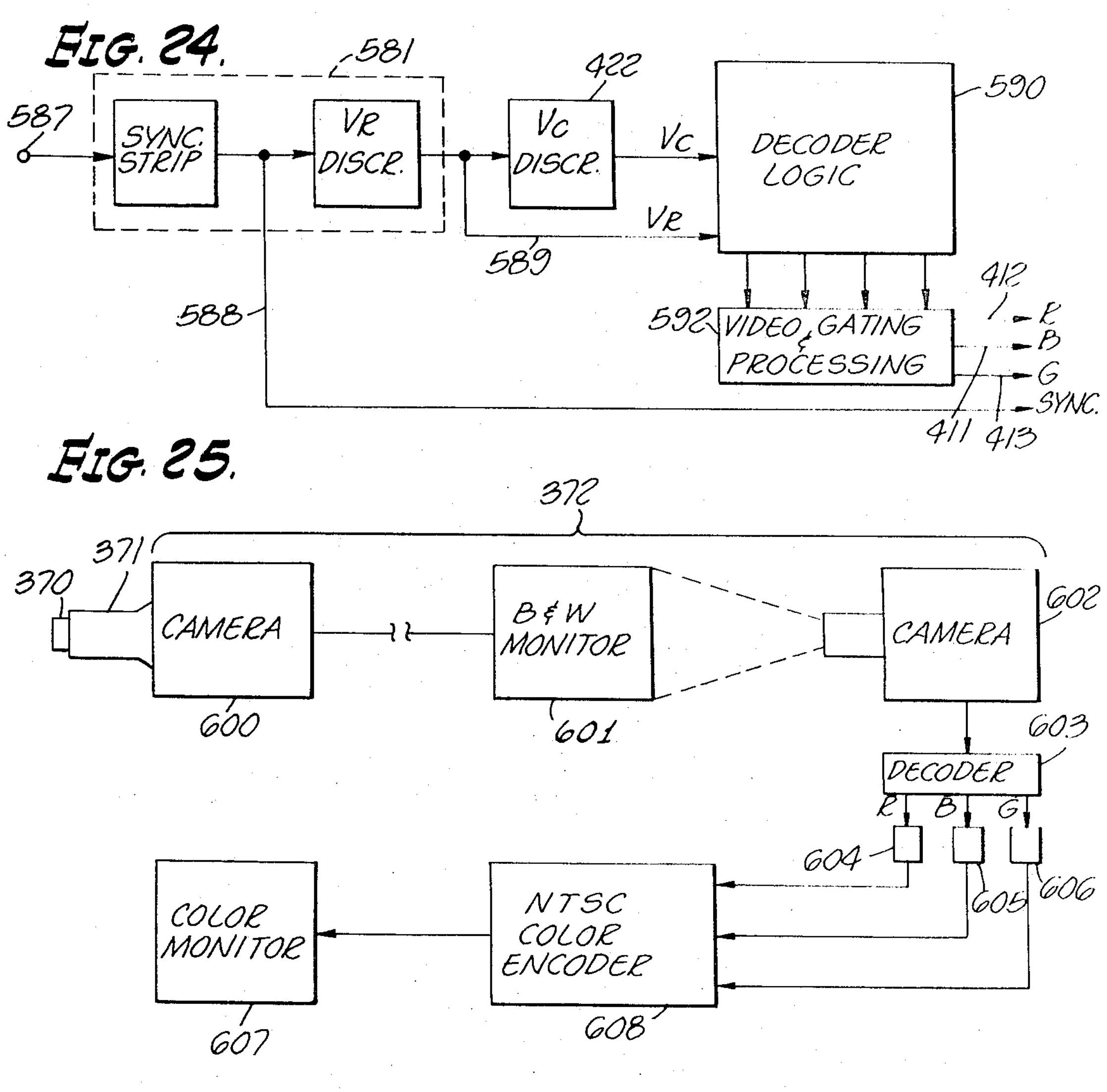
FIG. 24 is a block diagram of a logic system which gates and channels video from a video signal train as depicted in FIGS. 19*a* and 19*b* into proper inputs of a display device and incorporates portions of the circuitry from FIGS. 12 and 16.
FIG. 25 is a block diagram of a color television system according to the present invention incorporating remotely located camera optics.

FIG. 24 illustrates a logic system which gates and channels video by color into the proper inputs of a display. The video may be in the encoded form as shown in FIG. 19 or 20. It may be encoded and stored on tape, or encoded and transmitted by wire. An input 587 receives the video and supplies it to a sync stripper and $V_r$ discriminator which may be like the overdriven amplifier stage 581 in FIG. 23which is found in conventional receivers. Sync is taken off on a line 588 and $V_r$ pulses on a line 589. The $V_r$ pulses are applied to the $V_c$ rate pulse discriminator 422 of FIG. 17. A decoder logic 590 comprises the logic circuit of FIG. 16 above dashed line 591 shown therein. The video gating and processing circuit 592 comprises the circuit 283 of FIG. 12 below line 593 therein. Thus, the $V_r$ pulses on line 589 are connected to line 430 and the $V_c$ pulses to input 465 of FIG. 16. The input lines 331, 332, 333 and 334 of the circuit 283 of FIG. 12 are respectively coupled to the resistors 457, 458, 452 and 448 of FIG. 16. The outputs are lines 411–413 of FIG. 16, and are applied to a display device, or alternatively are encoded and recorded or sent down a line to a display device.

FIG. 25 illustrates in block form an "extended" or "remote" optics arrangement mentioned briefly during the discussion of FIG. 13. This system is for use where the modified optics camera is more or less inaccessible or remotely located, such as for forestry use where cameras are mounted on poles for fire detection or other surveillance purposes, highway traffic surveillance, and so forth. Basically, the lens 370, and modified optics 371 are the same as the lens 56 and optics 36 of FIG. 3. The camera 600 may be any standard black and white variety wherein vertical and horizontal scan amplitudes have been adjusted to scan a 9:4 vertical to horizontal aspect ratio. The output of the camera is supplied by antenna or cable transmission to a conventional black and white monitor 601 which displays a single frame consisting of three vertical stacked images as seen in FIG. 4*a*. A second camera 602 similar to camera 38 of FIG. 3 but without color optics then views the image and sends signals to camera decoder 603 which in turn supplies the proper red, blue and green outputs. These outputs may be applied to duty cycle extending devices 604–606, and then to a standard encoder (colorplexer) 608. The resulting NTSC color is applied to a display device 607 such as a monitor. It will be apparent that the vertical scan rate ratio (e.g., three to one) described throughout this specification applies to the camera 602 and display device 607 in the system of FIG. 25 inasmuch as the camera 600 and monitor 601 essentially only serve as an extension of the modified optics 371 from the camera 602.

The system is like remote control of the optics 371 because the system allows precise control of registration of images on every geometrical plane, i.e., on the vertical, horizontal and rotational axes. It allows compensation for distortions in the original images. The camera 600 and monitor 601 may communicate by telephone, cable, air transmission and so forth, and may be spaced close together or by a great distance.

The camera 602 has a conventional lens, and may employ a vidicon 46 as in FIGS. 5–6. It views the already separated images on the monitor 601. One image can be accurately positioned on another by electronically controlling the centering by control of the vertical and horizontal scanning coils of the camera 602 for each color image or interval separately. If for example, the red and green images are in correct alignment vertically, and blue is displaced vertically, rotation of a blue vertical centering control can be used to adjust the registration. If green is misaligned horizontally, a similar operation can be performed with a green horizontal centering control. It will be apparent that such controls need only be provided for two color channels, the third being a fixed reference. Therefore, only four controls for this purpose are needed in the camera 602.

Figure 26:
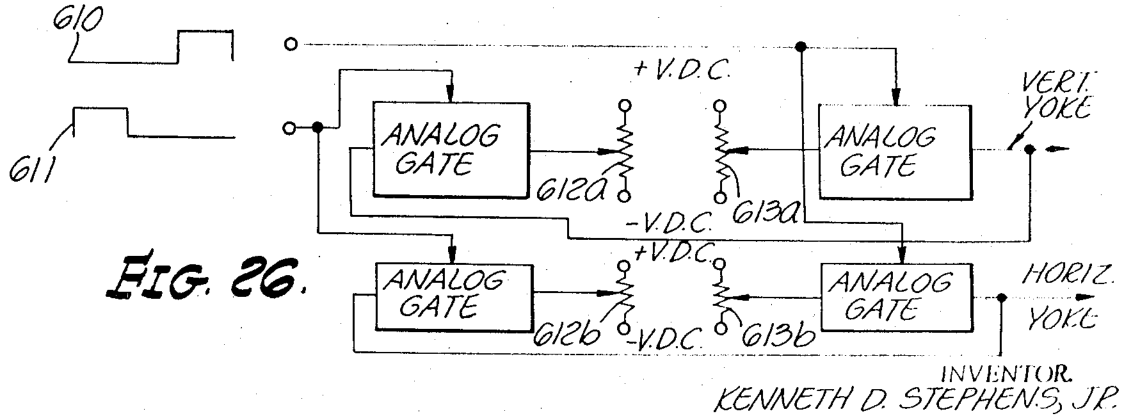
FIG. 26 is a diagram illustrating the manner in which control of registration can be obtained in the system of FIG. 25.

FIG. 26 illustrates how analog control voltages are derived and gated for alignment of the images. The camera vertical drive is fed to a divide-by-three flip-flop configuration, as described earlier, which generates waves 610 and 611. One of these waves keys a gate for green an another for blue, and each is fed to two analog gate circuits as seen in FIG. 26 to provide signals to the camera 602 which are applied to the vertical and horizontal yokes for that color to add to the respective sweep signals. By adding a controllable voltage to the vertical or horizontal sawtooth scan voltage for one color image period, that image can be positioned as desired. The magnitude of the added voltages is controlled by the potentiometers 612*a* and 613*a* (for vertical) and potentiometers 612*b* and 613*b* (for horizontal).

The system of FIG. 25 also allows automatic optical interlace between the color segments or images to be achieved. For example, assuming a frame rate of 60 hertz and 787 lines per frame, then each color segment consists of a video field with an effective rate of 180 hertz and 262⅓ lines. It will be apparent that the fractional one-third line at the end of one frame places the next color segment in a position vertically removed from the preceding segment by one-third line. In a like manner the final color segment is similarly displaced by one-third line effectively creating a resultant fully interlaced image of 787 lines with the same resultant picture as in a line sequential system. However, other field rates can be chosen to average the effect of interlace over the face of the color display device as seen by the viewer.

Figure 27:
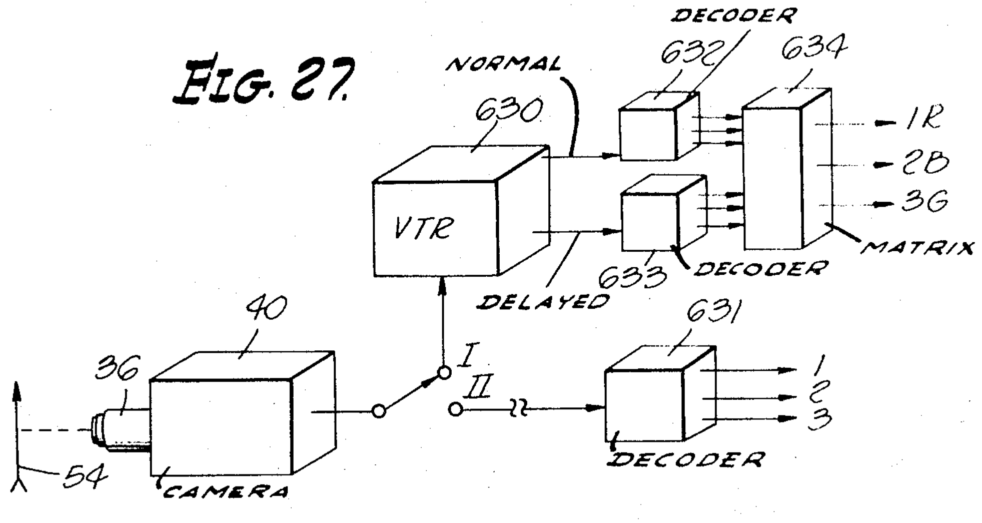
FIG. 27 is a block diagram representing another embodiment of a camera according to the present invention and illustrates various camera output capabilities.

A block diagram of another embodiment of a camera system of this invention is shown in FIG. 27. This embodiment differs from that of FIG. 3 for example chiefly in the deletion of color channel decoder logic within the camera and the substitution of a suitable color channel identifier to facilitate selective transmission of the train of sequential color signals to (1) a video tape recorder 630 or (2) by a cable to a decoder 631 which is adapted to feed a conventional three-gun color television receiver. A suitable channel identifier is illustrated in FIG. 21*a*.

One suitable helical scan video tape system 630 is disclosed in U.S. Pat. application Ser. No. 522,623, filed Jan. 24, 1966, entitled "Recording and/or Reproducing High Frequency Signals," now U.S. Pat. No. 3,539,712, the disclosure of which is incorporated herein by reference. Two separate outputs normal video and delayed video, the latter being delayed by one field for example, from the recorder 630 may be fed through two identical decoders. The respective color outputs from the decoders 632 and 633 and color combined in an electronic matrix 634 so as to appear as three output channels of enhanced red, blue and green respectively. The matrix 634 may be of any suitable type so as to combine the respective red, blue and green outputs of the two decoders by coupling directly, resistively, capacitively, and/or actively, such as by transistors.

Extensions and Color Enhancing Systems

Figure 28:
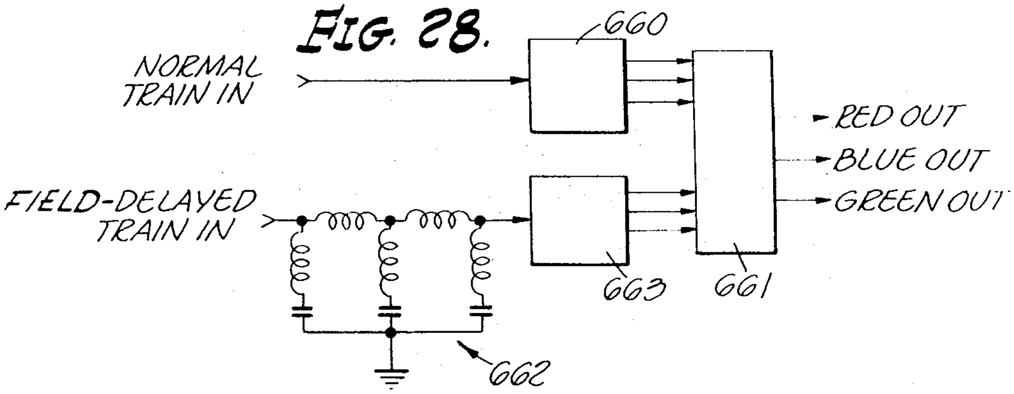
FIG. 28 represents schematically a system for decreasing edge breakup and/or smear through duty cycle extension of the display.

There was discussed above the application of the camera output to a video tape recorder 630 as shown in FIG. 27 for color enhancement. FIG. 28 illustrates partly in schematic and partly in block form circuitry for use with "duty cycle extension" devices, notably and appropriately modified helical scan video tape recorder 630 previously described in conjunction with FIG. 27. From the output of such a device, a normal video train is directed into an appropriate color decoder 660 which may be like the decoder 632 of FIG. 27, feeding red, blue and green outputs into a special matrix configuration 661. The field delayed output video train, (delayed one or more fields), however, first passes through a high-frequency rolloff network 662 before feeding a duplicate decoder 663. Red, blue and green outputs from the duplicate decoder 663 likewise are directed into matrix electronics 661. The function of special matrix configuration 661 is to combine in-time normal and delayed sequential signals pertaining to each individual color, effectively extending the duty cycle of each color channel, and may be like the matrix 634 of FIG. 27 described above.

In the normal duty cycle, the time required to scan one primary color image is one-third the time required to scan the entire raster. For instance, if each primary color requires one-sixtieth of a second, one-twentieth of a second is required for the entire raster. The viewer detects this time difference as flicker. The above-described matrix of normal and delayed video trains effectively extends the primary color image scan time from one-third to two-thirds the scan time, thereby substantially avoiding problems of flicker.

Use of the roll off network 662 is desirable in decreasing edge breakup and smear, particularly with regard to moving objects, by averaging the fine detail in the delayed and normal video signals.

Figure 29:
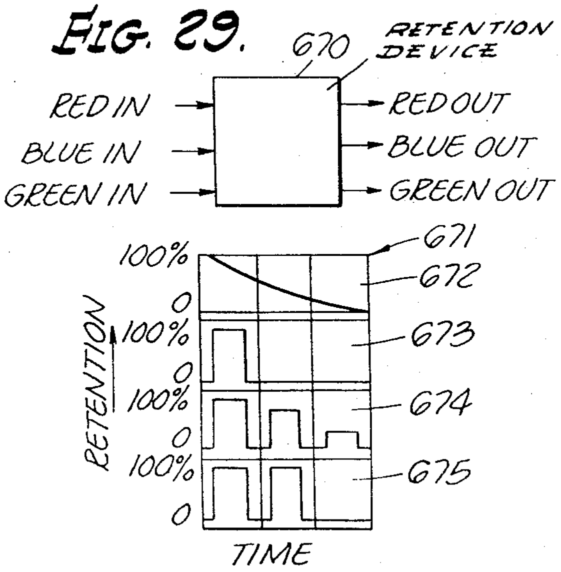
FIG. 29 represents in block form a system used with certain extended persistence reproducing devices, notably Eidophor-type color television projection systems and/or high-lag cathode-ray tubes.

Reference is now made to FIG. 29 wherein a block diagram depicts the use of a suitable retention device 670 for achieving a degree of display duty cycle extension similar to that described for FIGS. 27 and 28. Such a device accepts sequential red, blue and green inputs and, by means of color channel display persistance, contributes to the reduction of flicker and the extension of color channel brightness and saturation. One example of such a device is a simultaneous three chamber Eidophor-type television projection system, described in U.S. Pat. application Ser. No. 532,267, filed Mar. 7, 1966, for "System for Television Reproduction" now U.S. Pat. No. 3,485,944 the disclosure of which is incorporated herein by reference, the persistance of which can be altered by means such as chamber temperature control, etc. Another example of a suitable retention display device is a three-gun color television monitor or receiver incorporating a high-persistance cathode ray tube, as for example, a 21CYP22 (lag, approximately 25 milliseconds). Graph 671 represents the color saturation of each of three one-sixtieth of a second intervals which, when combined, represent the scan time for one raster. The graph 671 is typical of the duty cycle extension effect exhibited by some channel retention devices. More specifically, 672 is a decay graph illustrating arbitrary persistance characteristics of a decay phosphor over a one-twentieth of a second period. Graph 673 depicts a fully saturated red object as it would appear (in time) at the input of retention device 670. Note that due to the sequential nature of repetition for a given color channel, there is no representation for the second or third one-sixtieth of a second (field) period. Graph 674 shows this same fully saturated red signal as it would appear (in time) to the viewer. The repetition of the first field information in the second and third field portions significantly adds to color saturation and reduced apparent flicker. Graph 675 depicts another typical duty cycle effect for reducing flicker and improving color saturation, namely a total replay of each video field as described for video tape duty cycle extension in FIG. 28.

Figure 30:
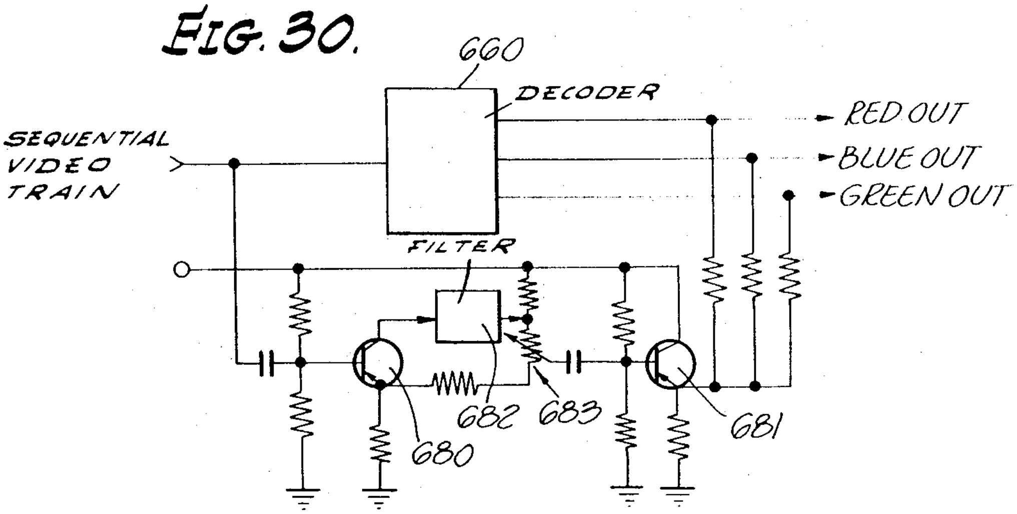
FIG. 30 schematically represents another system for increasing resolution and otherwise boosting picture quality by decreasing edge breakup and smear at the display.

FIG. 30 represents, partly in schematic and partly in block, one possible system for quality enhancement for use in color television systems of field sequential nature. An incoming sequential video train, in addition to feeding a color decoder 660, is directed into a special high-pass circuit made up of amplifier 680, 681 and an appropriate rolloff filter 682, similar to the filter 662 described for FIG. 28 above. The circuit is found to achieve extremely sharp frequency passing characteristics beginning, for example, at 1.5 megacycles. The video is inverted at the collector of amplifier 680 and high-frequency content is substantially eliminated, the resultant signal appearing at the top of the balance potentiometer 683. Equal, but opposite (noninverted) video containing all of the original high-frequency information is directed to the bottom of same balance control 683. It can be seen that a suitable position can be found on potentiometer 683 wherein complete cancellation has occurred for all low-frequency video content. The remaining high-frequency information is passed through emitter-follower stage 681, where it is reinserted into all channels from decoder 663. This yields an in-time, all-channel display of all high frequency video content for increasing resolution and otherwise boosting picture quality by decreasing edge breakup and smear at the display.

The present embodiments of this invention are to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. A sequential color television system comprising
black-and-white television camera means having a raster and a scan rate,
color splitting optics for separating a polychromatic image into plural components, said color splitting optics including means for focusing said plural components in a single plane for reception by said camera means,
a television display device having a color cathode-ray tube for receiving color representing signals from said camera means and providing a color display, said display device having synchronizing means for synchronizing the display of said color representing signals respectively with those received from said camera means, and said display device having a scan rate which is (a) the number of said plural components per raster of said camera means, times (b) said scan rate of said camera means.

2. A system as in claim 1 wherein the number of said plural components is three and the ratio between said scan rates of said receiver and camera means is three to one.

3. A system as in claim 2 wherein said scan rates and vertical field scan rates, and the vertical field scan rate of said camera means is 20 hertz and the vertical field scan rate of said display device is 60 hertz.

4. A system as in claim 2 wherein
said scan rates are vertical field scan rates, and the vertical field scan rate of said camera means is 40 hertz and the vertical field scan rate of said display device is 120 hertz.

5. A system as in claim 2 wherein
said scan rates are vertical field scan rates, and the vertical field scan rate of said camera means is 40 hertz and the vertical field scan rate of said display device is 150 hertz.

6. A system as in claim 2 wherein
said scan rates are vertical field scan rates and the vertical field scan rate of said camera means is 60 hertz and the vertical field scan rate of said display device is 180 hertz.

7. A system as in claim 1 wherein
said camera means includes a pickup tube having a face for receiving said plural components of said polychromatic image, and
said color splitting optics includes a dichroic optical system comprising a plurality of color-selective dichroic surfaces for separating said image into said plural components.

8. A system as in claim 7 wherein said dichroic surfaces are first surface dichroic mirrors.

9. A system as in claim 7 wherein
said dichroic optical system comprises a pair of first surface dichroic mirrors in front of the face of said pickup tube, the first of said mirrors serving to reflect red light and form a red component, and the second of said mirrors serving to reflect green light and form a green component and pass a blue component and said dichroic optical system comprising reflector means for reflecting said red and green components to the face of said pickup tube, the blue component passing said mirrors to said face of said pickup tube.

10. A system as in claim 7 wherein
said dichroic surfaces are prism surfaces.

11. A system as in claim 7 wherein
said dichroic optical system comprises a dichroic prism assembly having a green reflecting surface and a blue reflecting surface and at least a mirror surface for relaying three segregated color components of said polychromatic image to the face of said pickup tube.

12. A field sequential color camera comprising
a television camera head having a black-and-white pickup tube with a face for receiving plural components of a polychromatic image,
means for successively scanning each component of said polychromatic image for display as a complete raster, and
color splitting optics means for separating said polychromatic image into said plural components along separate paths, said optics means comprising a plurality of color-selective dichroic surfaces for separating said image into said plural color components and means in at least one of said paths for directing said components to the face of said pickup tube in a focused and adjacent relationship.

13. A camera as in claim 12 wherein
said dichroic optical system comprises a pair of first surface dichroic mirrors in front of the face of said pickup tube, the first of said mirrors serving to reflect a first colored light and form a first color component, and the second of said mirrors serving to reflect a second color light and form a second color component and pass a third color component, and said dichroic optical system comprising reflector means for reflecting said first and second color components to the face of said pickup tube, the third color component passing said mirrors to said face of said pickup tube.

14. A camera as in claim 12 wherein
said dichroic optical system comprises a dichroic prism assembly having a first color reflecting surface and a second color reflecting surface and at least a reflective surface for relaying three segregated color components of said polychromatic image to the face of said pickup tube.

15. A camera as in claim 12 wherein said first color is blue and said second color is green 16. A camera system for sequential color comprising
camera means having a black-and-white pickup tube, said pickup tube having a face for receiving plural components of a polychromatic image,
dichroic optical means for splitting said polychromatic image into said plural components and including means for relaying said components to focus on the face of said pickup tube,
scanning circuit means coupled with said camera means for providing a raster for said pickup tube, the field rate of said raster being a fraction of the field rate of television display means adapted to receive signals from said camera system, and
control circuit means coupled with said camera means for receiving video information therefrom and providing output signals enabling separation of said respective plural components for synchronized display by television display means.

17. A system as in claim 16 wherein
said control circuit means comprise a gating circuit for receiving said video information and providing distinct output signals corresponding to said respective plural components.

18. A system as in claim 16 wherein
said control circuit means includes encoding circuit means for developing composite video information from said video information supplied from said camera means, said composite video information including pulses indicative of the field rate of said camera means.

19. A system as in claim 16 wherein
said control circuit means includes signal combining circuit means for receiving video information from said camera means, and
phase keyer means is coupled between said camera means and said signal coupling means for receiving field scan rate information from said camera means and system for receiving video information from said camera means and for separating said video information according to said plural components into respective channels, and means for relaying said separated information to a television display device.

20. A system as in claim 16 wherein
said control circuit means includes a phase and amplitude modulated oscillator for receiving video information from said camera means,
phase keyer means coupled between said camera means and said oscillator for receiving field scan rate information from said camera means and supplying signals to said oscillator indicative of the time of occurrence of said plural components to alter the phase of said oscillator and
sync means coupled with the output of said oscillator for providing a color signal compatible with conventional color receivers.

21. A system as in claim 16 wherein
said scanning means includes a counter system for generating scanning signals for said camera means and for generating control signals for said control circuit means, and
said control circuit means includes a gating circuit timed by said control signals from said counter system for receiving video information from said camera means and for separating said video information according to said plural components into respective channels, and means for relaying said separated information to a television display device.

22. A system as in claim 16 wherein
said scanning means includes oscillator means for generating scanning control signals for said camera means and control signals for said control circuit means, and
said control circuit means includes an input circuit for receiving video information from said camera means and a plurality of gating circuits coupled with said input circuit and coupled to receive said control signals for separating said video information according to said plural components into respective output channels.

23. A system as in claim 16 wherein
said control circuit means comprises a color encoder for generating a train of color codified signals, and
said television display device includes a color cathode-ray tube coupled with said color encoder and controlled by said color encoder, said color encoder serving to operate color control elements of said cathode-ray tube in synchronism with the receipt of respective plural components of said image to provide a color display representative of said polychromatic image.

24. A system as in claim 23 wherein
said color encoder control is facilitated by 16 means coupled within said display device, said decoder means operating in cooperation with said color encoder means.

25. A system as in claim 24 wherein
said color decoder comprises means for receiving identification pulses representing said plural components, and logic means coupled therewith for generating output gating signals for control of said cathode ray tube.

26. A system as in claim 24 wherein
said display device includes a pulse discriminator for detecting pulses representing receipt of groups of output signals representing said plural components.

27. A system as in claim 16 wherein said television display device includes (a) a color cathode-ray tube, (b) a pulse discriminator for detecting said output signals from said control circuit means and providing color identification pulses, and (c) a color decoder for receiving said color control signals and providing output gating signals to said color cathode ray tube for gating the operation of said cathode-ray tube to sequentially display color images representative of said plural components of said polychromatic image, said color decoder including a logic circuit for receiving said color identification pulses and amplifier means coupled with said logic circuit for providing plural discrete outputs representative of said plural components of said polychromatic image.

28. A system as in claim 16 wherein said television display device comprises (a) a color cathode-ray tube, (b) a pulse discriminator for receiving said output signals, and generating color identification pulses, (c) synchronization generation means for receiving said color identification pulses and providing gating signals, and (d) video gating and processing means for receiving said gating signals, said gating and processing means including a gating circuit for controlling the application of video information from said camera means to said cathode-ray tube.

29. A camera system as in claim 16 wherein said control circuit means comprises an encoder circuit for generating a train of video signals interspersed with color identification information, comprising a synchronization and logic circuit for generating first and second color identification pulses, a video circuit, and an adder circuit, said color identification pulses from said sync and logic circuit being applied to said adder circuit, and the output of said adder circuit and video information from said video circuit being combined to provide said output signals comprising color representing signals and color identification signals.

30. A camera system as in claim 16 wherein said scanning circuit means comprises a sweep circuit including an input terminal for receiving trigger pulses, a pair of interconnected semiconductor means for receiving said trigger pulses and dividing the same by a whole integer and providing drive pulses, a second pair of interconnected semiconductor means, the first of which functions as a sawtooth generator and the second of which functions as an output and linearizing stage, and coupling means intercoupling the output drive pulses from said first pair of amplifier means to the second amplifier of the second pair of amplifier means.

31. A camera system as in claim 16 wherein said control circuit means comprises a color decoder for receiving said video information and generating on output lines separate color output signals, and high pass circuit means for receiving said incoming video information for providing high frequency output information which is combined with the output signals from said decoder, said high pass circuit means comprising a first amplifier for receiving said video train and providing first and second output signals, said second output being inverted with respect to said first output, a rolloff filter having an input for receiving said inverted output and having an output coupled with resistive divider means, said first output signal being coupled to said resistive divider means, and output signals from said resistive divider means being adjustable for cancellation of relatively low frequency signal components, said output signals being coupled to the input of a second amplifier, said second amplifier being coupled to the output lines of said decoder.

32. A quality enhancement circuit for use in a field sequential color television system receiving incoming video information comprising a color decoder for receiving said video information and generating on output lines separate color output signals, and high pass circuit means for receiving said incoming video information for providing high frequency output information which is combined with the output signals from said decoder, said high pass circuit means comprising a first amplifier for receiving said video train and providing first and second output signals, said second output being inverted with respect to said first output, a rolloff filter having an input for receiving said inverted output and having an output coupled with resistive divider means, said first output signal being coupled to said resistive divider means, said first output signal being coupled to said resistive divider means, and output signals from said resistive divider means being adjustable for cancellation of relatively low frequency signal components, said output signals being coupled to the input of a second amplifier, said second amplifier being coupled to the output lines of said decoder.

33. In a television camera, the improvement comprising dichroic means interposed between an object to be televised and a single camera pickup tube to serially separate a polychromatic image into several color images, said dichroic means including means for focusing said color images in an ordered relation upon the face of the pickup tube, said pickup tube comprising a comparatively high-lag device, and means for successively scanning each color image for display as a complete raster.

34. In a device as defined in claim 33 wherein said pickup tube comprises a vidicon and said dichroic means comprises dichroic prisms.

35 In a method of sequential television pickup and transmission, the steps of introducing a polychromatic light image into the lens system of a television camera having a single pickup tube, first segregating one primary color image from other primary color images which comprise the polychromatic light image and, thereafter, segregating a second primary color image to present an in-focus array of at least three dichroically segregated primary color images at said pickup tube, serially scanning said primary color images, converting each said scan into an electrical signal thereby forming a sequential signal train, and transmitting the resultant sequential signal train to a color-receiving device.

36. In a method defined in claim 35 wherein the paths of the primary color images, after segregation, are essentially parallel one with the others and the primary color images are impinged generally perpendicularly upon the face of the camera pickup tube.

37. In a method as defined in claim 35 wherein said array comprises vertically stacked primary color images.

38. In a method as defined in claim 35 comprising impinging said primary color images upon the face of a pickup tube having comparatively high lag characteristics.

39. A method of transmission of sequential color signals to a color display device comprising the steps of supplying a polychromatic light image to a television camera, separating color components of said image and supplying said components to a pickup tube of said camera, serially scanning said components at a first scan rate and generating a sequential signal train, supplying said signal train to a color cathode-ray tube display device having a second scan rate and synchronizing the reproduction of said signal train by said display device with the respective color components in said sequential signal train.

40. A method as in claim 39 including separating three color components, and causing said first and second scan rates to be in a ratio of one to three.

41. A sequential color television system comprising black-and-white television camera means having a raster and a scan rate, color splitting means for separating a polychromatic image into plural focused components for reception by said camera means, a television display device having a color cathode ray tube for receiving signals from said camera means and providing a color display, said display device having a scan rate which is (a) the number of said plural components per raster of said camera means, times (b) said scan rate of said camera means, said color splitting means comprising an optical system for separating said polychromatic image into said plural components, a video camera for receiving said plural components, a second television display device, and means for transferring signals from said video camera to said second television display device, and said black-and-white television camera means views the display of said second television display device.

42. A system as in claim 41 wherein said television camera means includes analog voltage control means for providing variable control voltages to a deflection circuit of said camera means for allowing adjustment of the relative positioning of the color images received by said display device.

43. A system as in claim 42 wherein said control voltages are vertical and horizontal axis positioning control voltages for two of three color images of said display.

44. A system as in claim 21 wherein said counter system includes a series of integer counters employing stairstep waveform discharge through amplifier-trigger circuit means.

45. A system as in claim 21 wherein said counter system includes a series of binary counter semiconductor stages.

46. A field sequential color camera comprising a television camera head having a black-and-white pickup tube with a face for receiving plural components of a polychromatic image, color splitting means for separating said polychromatic image into said plural components, said color splitting means comprising a plurality of color selective dichroic surfaces for separating said image into said plural color components, a video camera for receiving said plural color components from said dichroic surfaces, a television display device, and means for transferring signals from said video camera to said television display device, and said pickup tube of said camera head being positioned to view the display of said television display device and to receive said plural color components on the face of said pickup tube in an adjacent relationship.

47. A system of field sequential color comprising optics means for splitting a polychromatic image into plural color images, said optics means including a dichroic optical system comprising a plurality of color-selective dichroic surfaces for separating said image into said plural components and means for focusing said plural components in a single plane, pickup tube means for receiving said color images, scanning means for said pickup tube means, said scanning means having a first vertical scan rate, and visual color display means for displaying a polychromatic representation of said first polychromatic image, said display means having a second vertical scan rate, said second vertical scan rate being an integer multiple of said first vertical scan rate.

* * * * *